(12) United States Patent
Schroeder

(10) Patent No.: US 10,597,238 B2
(45) Date of Patent: Mar. 24, 2020

(54) TRANSPORTING ARRANGEMENT AND EMPTY-CONTAINER ACCEPTING ARRANGEMENT

(71) Applicant: Wincor Nixdorf International GmbH, Paderborn (DE)

(72) Inventor: Berthold Schroeder, Ilmenau (DE)

(73) Assignee: Wincorbh Nixdorf International, GmbH, Paderborn (DE)

( * ) Notice: Subject to any disclaimer, the term of this patent is extended or adjusted under 35 U.S.C. 154(b) by 0 days.

(21) Appl. No.: 15/927,213

(22) Filed: Mar. 21, 2018

(65) Prior Publication Data
US 2018/0273308 A1 Sep. 27, 2018

(30) Foreign Application Priority Data
Mar. 21, 2017 (DE) .................. 10 2017 106 021

(51) Int. Cl.
*B65G 47/64* (2006.01)
*B07C 5/36* (2006.01)
*B65G 47/51* (2006.01)

(52) U.S. Cl.
CPC ............ *B65G 47/647* (2013.01); *B07C 5/362* (2013.01); *B65G 47/5145* (2013.01); *B65G 2201/0244* (2013.01); *B65G 2203/0258* (2013.01); *B65G 2203/042* (2013.01); *B65G 2814/0344* (2013.01)

(58) Field of Classification Search
CPC .. B65G 47/647; B65G 47/648; B65G 47/644; B65G 41/00; B65G 21/12; B65G 13/12
USPC .................. 198/369.2, 435, 861.4, 861.5
See application file for complete search history.

(56) References Cited

U.S. PATENT DOCUMENTS

| 1,556,438 | A | * | 10/1925 | Hanson | .................. | B65G 49/08 |
| | | | | | | 414/416.04 |
| 3,169,630 | A | * | 2/1965 | Christiansen | ........ | B65G 47/648 |
| | | | | | | 209/600 |
| 5,692,593 | A | * | 12/1997 | Ueno | ....................... | B23Q 7/03 |
| | | | | | | 198/369.2 |

(Continued)

FOREIGN PATENT DOCUMENTS

| DE | 1506444 A | 6/1969 |
| DE | 102009025199 A1 | 12/2010 |

(Continued)

*Primary Examiner* — William R Harp
(74) *Attorney, Agent, or Firm* — Black, McCuskey, Souers & Arbaugh, LPA

(57) ABSTRACT

According to various embodiments, the transporting arrangement may have the following: a multi-level transporting section, which has a first transporting level and a second transporting level (102b) arranged above it; a feeding conveyor for feeding a container in the direction of the multi-level transporting section; a distributing conveyor between the feeding conveyor and the multi-level transporting section, the distributing conveyor (106) being mounted at the multi-level transporting section pivotably between the first transporting level and the second transporting level and intended for distributing the container to the first transporting level or the second transporting level; a sensor arrangement, which is configured to sense at least one physical property of the container; a pivoting control device, which is configured to pivot the distributing conveyor between the first transporting level and the second transporting level if the at least one property satisfies a predetermined criterion.

8 Claims, 15 Drawing Sheets

(56) References Cited

U.S. PATENT DOCUMENTS

| | | | | |
|---|---|---|---|---|
| 6,105,751 | A * | 8/2000 | Jentjens | B65G 47/715 |
| | | | | 198/435 |
| 6,227,377 | B1 | 5/2001 | Bonnet | |
| 6,238,175 | B1 * | 5/2001 | Gotz | B65H 3/0816 |
| | | | | 198/435 |
| 7,946,797 | B2 * | 5/2011 | Smith | A01K 31/165 |
| | | | | 198/435 |
| 8,079,457 | B2 * | 12/2011 | Heinz | B27B 25/04 |
| | | | | 198/369.1 |
| 8,312,983 | B2 * | 11/2012 | Kuo | H01M 10/14 |
| | | | | 108/106 |
| 8,851,266 | B2 * | 10/2014 | Liu | B65G 47/647 |
| | | | | 198/347.4 |
| 9,016,468 | B2 * | 4/2015 | Ventz | B65G 21/14 |
| | | | | 198/861.5 |

FOREIGN PATENT DOCUMENTS

| | | |
|---|---|---|
| DE | 102013202950 A1 | 8/2014 |
| WO | 9912834 A1 | 3/1999 |
| WO | 200603882 A1 | 4/2006 |

* cited by examiner

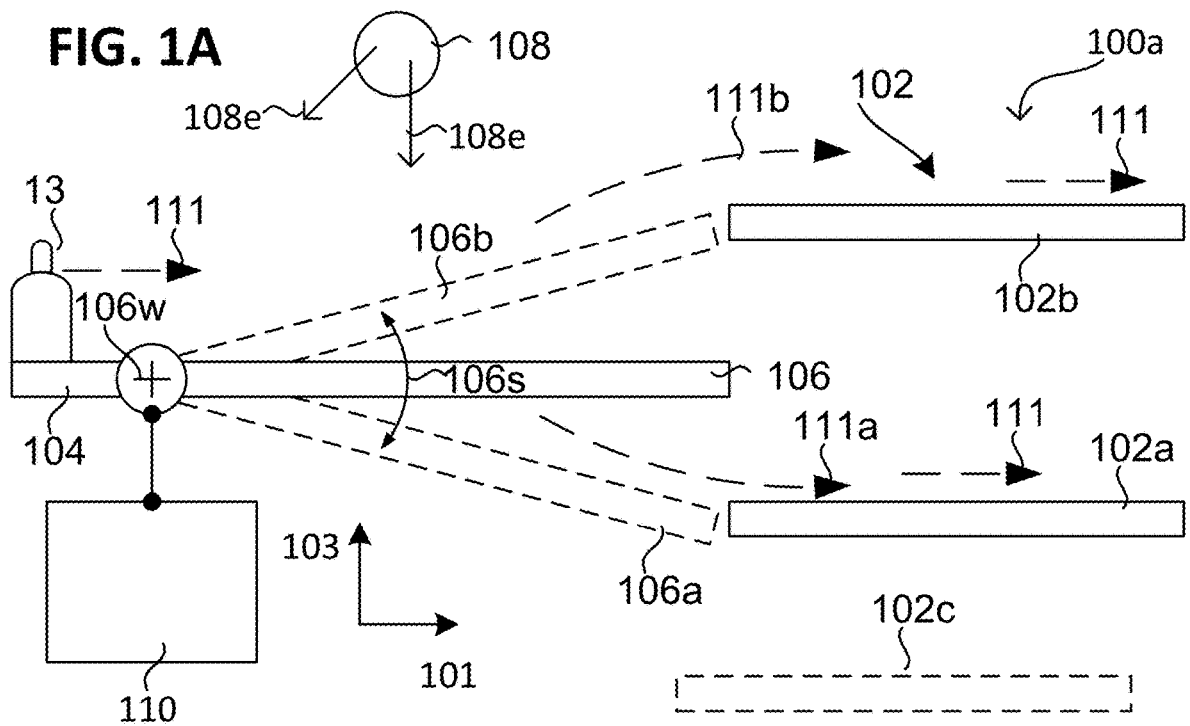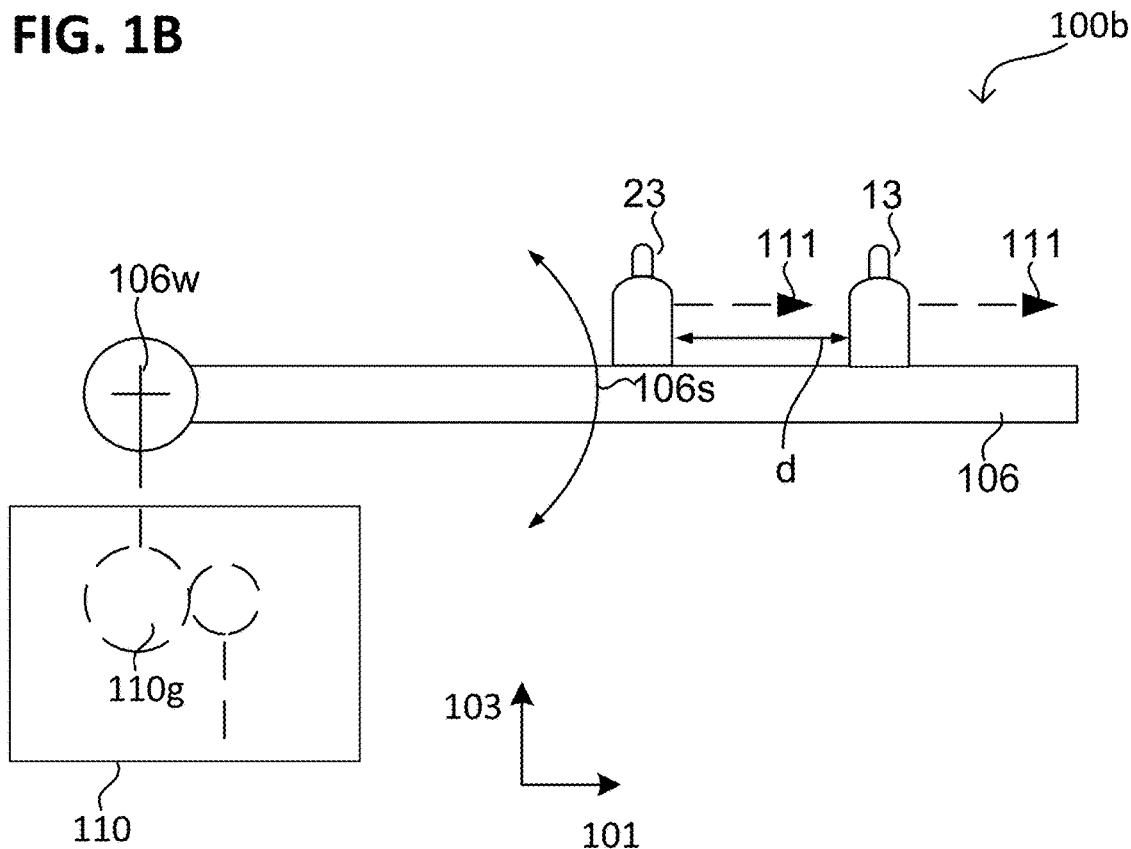

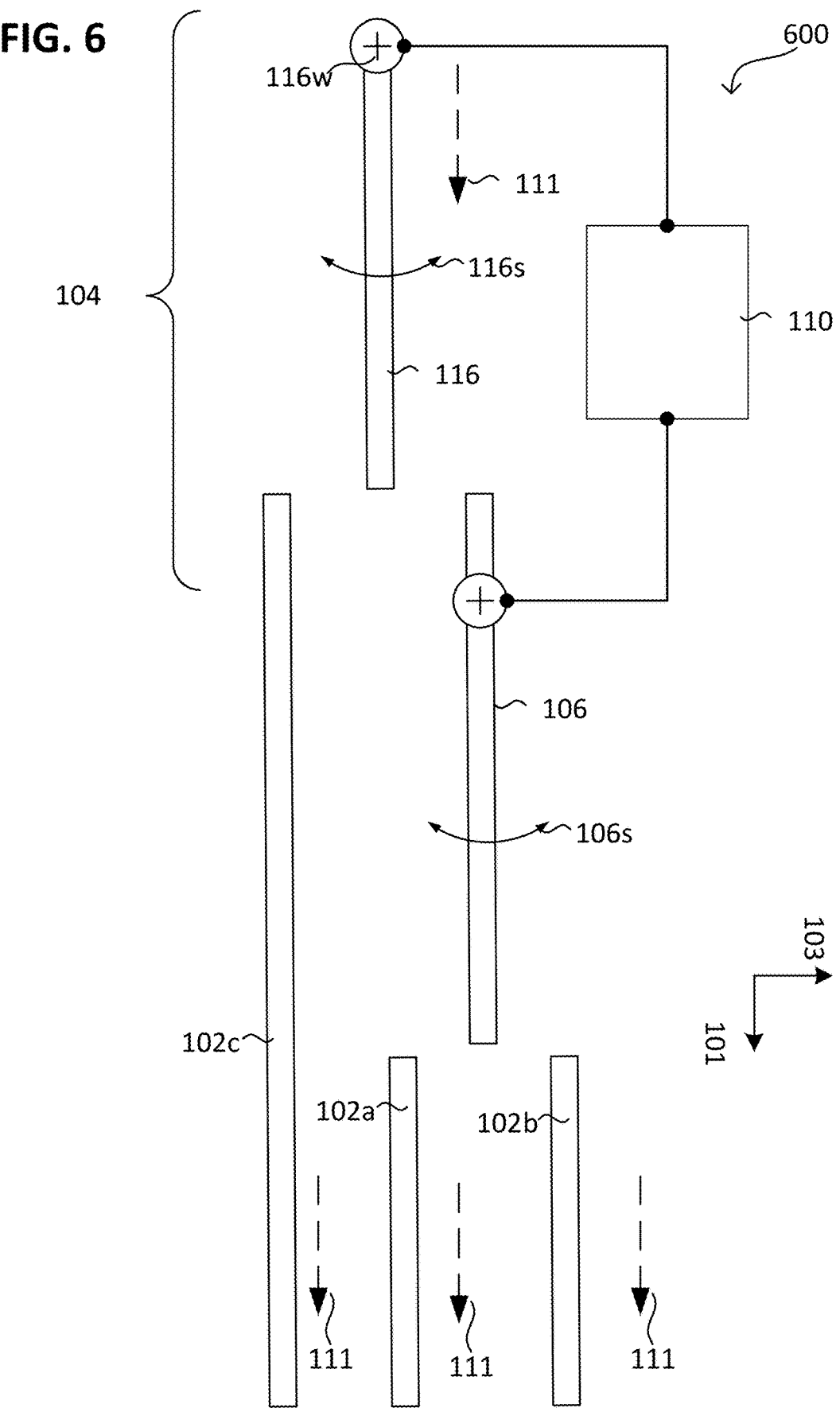

TRANSPORTING ARRANGEMENT AND EMPTY-CONTAINER ACCEPTING ARRANGEMENT

CROSS-REFERENCE TO RELATED APPLICATIONS

This application claims priority to and the benefit of German Patent Application No. 10 2017 106 021.9, Filed 21 Mar. 2017, the contents of which are hereby incorporated by reference in their entirety.

BACKGROUND AND SUMMARY

The invention relates to a transporting arrangement and an empty-container accepting arrangement.

A system for taking back empty containers may be part of a return chain which sends the empty containers taken back by means of the empty-container taking-back system for example for reuse or recycling (for example for the recovery of raw materials). In the food industry, the empty containers are also referred to as empties and the taking-back system is also referred to as an empty-container taking-back system or reverse vending machine.

Depending on the area of use of the empty-container taking-back system, the empty containers taken back by means of the empty-container taking-back system may be sorted. Used for this are branched transporting systems, which sort the empty containers for example into corresponding containers or storage areas. For example, the empty-container taking-back system may have a sorting device at points at which the transporting system branches. By means of the sorting device, the empty containers can be distributed to various transporting sections of the transporting system, which may run next to one another (horizontal distribution) and/or one above the other (vertical distribution). In particular, transporting levels onto which the empty containers are distributed that are arranged one above the other often require little space to be provided.

The throughput and the transporting sequence of the transporting system are conventionally restricted by the operating speed and reliability of the individual sorting devices. For example, sorting devices that are too slow form a kind of "bottleneck", which can cause backups and consequently impede the transporting sequence of the entire transporting system. Alternatively or in addition, unreliable sorting devices may distribute the empty containers incorrectly. Apart from the effort involved in correcting the sorting error, the backup section, which is designed for small quantities of containers, can quickly fill up if too many containers are fed to it because of a sorting error.

A conventional transporting system may be slow for example if empty containers have to be raised and/or particularly heavy container loads (for example full empties crates) have to be distributed. Similarly, sorting errors may occur if the empty containers cannot be clearly classified. Conventionally, the unreliability may increase if a large number of types of empty container are to be sorted and/or they have to be sorted at high speed (i.e. with a high throughput).

According to various embodiments, a transporting arrangement that in graphic terms allows quicker vertical distribution with less unreliability (or a lower error rate) is provided. In graphic terms, the transporting arrangement may be configured to classify the empty containers (for example on the basis of their weight) and distribute them in the vertical direction. Distribution on the basis of classification may also be referred to as sorting.

According to various embodiments, a transporting arrangement is provided, the distribution mode of which (also referred to more generally as the operating mode) may be configured as switchable. For example, optionally (for example as desired by users), heavy container loads for example (for example full empties crates) may be transported in the upward direction. Alternatively, light container loads for example can be transported in the downward direction.

Depending on the height or physique of a store employee, it is ergonomically better/easier for him or her to transport heavy empties crates to an upper transporting level or to a lower transporting level. For this, a rapid change of the transporting guidance is made possible by corresponding user-side setting or selecting of the operating mode. In this way, the "distance" from the transporting level that the store employee still has to overcome can be optimized to the height and the wishes of the store employee. Thus, for example, the empties crates can be provided near the floor and/or the filling of empty empties crates can be made easier.

According to various embodiments, the following are provided: a quick sorting possibility, a quick transporting level change by means of an eccentric lifting gear mechanism, sorting by means of determining the weight of the empty containers (for example the empties crates), sorting by means of determining a color spectrum/logo of the empty containers (for example to differentiate and/or identify the material of the empty containers, such as for example plastic, such as polyethylene terephthalate, and glass), sorting by means of an empty container identification (for example crate identification), which takes place in the taking-back machine (e.g., a reverse vending machine) by means of its control technology (also referred to as color sequence control), and/or determination or differentiation of filled and non-filled crates for sorting. By the various procedures, the type of the respective empties crate can for example be determined.

According to various embodiments, a transporting arrangement may have the following: a multi-level transporting section, which has a first transporting level and a second transporting level arranged above it (for example vertically); a feeding conveyor for feeding a container (for example an empty container or empties crate) in the direction of the multi-level transporting section; a distributing conveyor between the feeding conveyor and the multi-level transporting section, the distributing conveyor being mounted at the multi-level transporting section (e.g., in a manner being) pivotably between the first transporting level and the second transporting level and intended for distributing the container to the first transporting level or the second transporting level; a sensor arrangement, which is configured to sense at least one physical property (for example weight, filling state or material) of the container; a pivoting control device, which is configured to pivot the distributing conveyor between the first transporting level and the second transporting level if the at least one property satisfies a predetermined criterion (also referred to as the distribution criterion).

The property may for example comprise or be formed by an extensive property (for example an extensive quantity), i.e. a property that changes with the size of the container (such as for example mass, volume and/or extent). Optionally, the property may comprise an intensive property (for example intensive quantity), i.e. a property that is invariant with respect to the size of the container (such as for example a color property, shape, material, chemical composition and/or filling state).

According to various embodiments, the pivoting control device may provide a number of operating modes, according to which the pivoting 106s of the distributing conveyor 106 takes place, the pivoting control device being configured as switchable between the number of operating modes. For example, the operating modes of the number of operating modes can be differentiated from one another (for example in pairs) in terms of the pivoting speed, the number of pivoting positions and/or the criterion.

According to various embodiments, the pivoting control device may have a movement gear mechanism, which is configured to convert a rotational movement into a translational movement bringing about (e.g., causing) the pivoting of the distributing conveyor.

According to various embodiments, the movement gear mechanism may have an eccentric. This allows a compact design and a quick pivoting movement, for example even in the case of a high container weight. The movement that is carried out for example by the eccentric, for example a sinusoidal movement, may also be realized in some other way, for example by means of a servo axis and/or a spindle and/or a toggle lever mechanism (as explained in more detail below) and/or a controllable frequency converter, which produces a sinusoidal movement. In other words, the movement gear mechanism may have as an alternative to an eccentric a servo axis, a spindle, a toggle lever mechanism and/or a controllable frequency converter.

According to various embodiments, the movement gear mechanism (also referred as to motion transmission or motion linkage) may have a spindle and/or a toggle lever mechanism. The spindle allows a high container weight to be moved by means of the distributing conveyor. The toggle lever mechanism allows a quick pivoting movement (in graphic terms because of the greater realizable lever).

According to various embodiments, the pivoting control device may also have an electric drive, which is configured to provide the rotational movement for the movement gear mechanism.

According to various embodiments, the multi-level transporting section may have an additional transporting level, which at the distributing conveyor is at the height of the first or second transporting level; the transporting arrangement (for example the distributing conveyor) having a horizontally distributing device, which is configured to distribute (horizontally distributing) between the first or second transporting level and the additional transporting level; and the pivoting control device being configured to switch over a transporting direction of the horizontally distributing device between to the first or second transporting level and to the additional transporting level if the at least one property satisfies an additional predetermined criterion.

According to various embodiments, the at least one property may represent at least one weight (also referred to as mass) and/or a color property and/or an identification (for example a logo) of the container, for example for determining the type of the respective container for empties, for example the empties crate.

According to various embodiments, the sensor arrangement may have a first weight sensor and/or a second weight sensor, the first weight sensor being configured to sense a weight acting on the feeding conveyor (for example of the container); and the second weight sensor being configured to sense a weight acting on the distributing conveyor (for example the container); the at least one property representing at least the weight sensed by means of the first weight sensor and/or the second weight sensor (for example of the container).

According to various embodiments, the first weight sensor may be integrated in the feeding conveyor. Alternatively or in addition, the second weight sensor may be integrated in the distributing conveyor.

According to various embodiments, the feeding conveyor and/or the distributing conveyor may have a transporting band.

According to various embodiments, the first transporting level and/or the second transporting level may have a roller conveyor, for example a passive roller conveyor (i.e. not driven). The first transporting level and/or the second transporting level may alternatively or in addition have one or more belt conveyors (or generally one or more driven conveyors).

According to various embodiments, the multi-level transporting section may have a third transporting level, which is arranged above or below the distributing conveyor; the feeding conveyor having an additional distributing conveyor, the additional distributing conveyor being mounted (e.g., in a manner being) pivotably between the distributing conveyor and the third transporting level and intended for distributing the feed to the third transporting level or the distributing conveyor (of the second transporting level); the pivoting control device also being configured to pivot the additional distributing conveyor between the third transporting level and the distributing conveyor if the at least one property satisfies a predetermined further additional criterion.

According to various embodiments, the feeding conveyor may be configured to transport the container and at least one additional container immediately following it with a transporting speed and a distance from one another; the pivoting control device being configured to pivot the distributing conveyor between the first transporting level and the second transporting level within a time period, the time period corresponding to the quotient of the distance and the transporting speed.

According to various embodiments, an empty-container accepting arrangement (also referred as to reverse vending arrangement) may have the following: a taking-back machine; and a transporting arrangement according to various embodiments for transporting a container accepted by the taking-back machine.

BRIEF DESCRIPTION OF THE DRAWINGS

Exemplary embodiments of the invention are explained in more detail below and are represented in the figures, in which:

FIGS. 1A and 1B show in each case a transporting arrangement according to various embodiments in a schematic cross-sectional view or side view;

FIG. 6 shows a transporting arrangement according to various embodiments in a schematic cross-sectional view or side view;

DETAILED DESCRIPTION

Figure 2A:
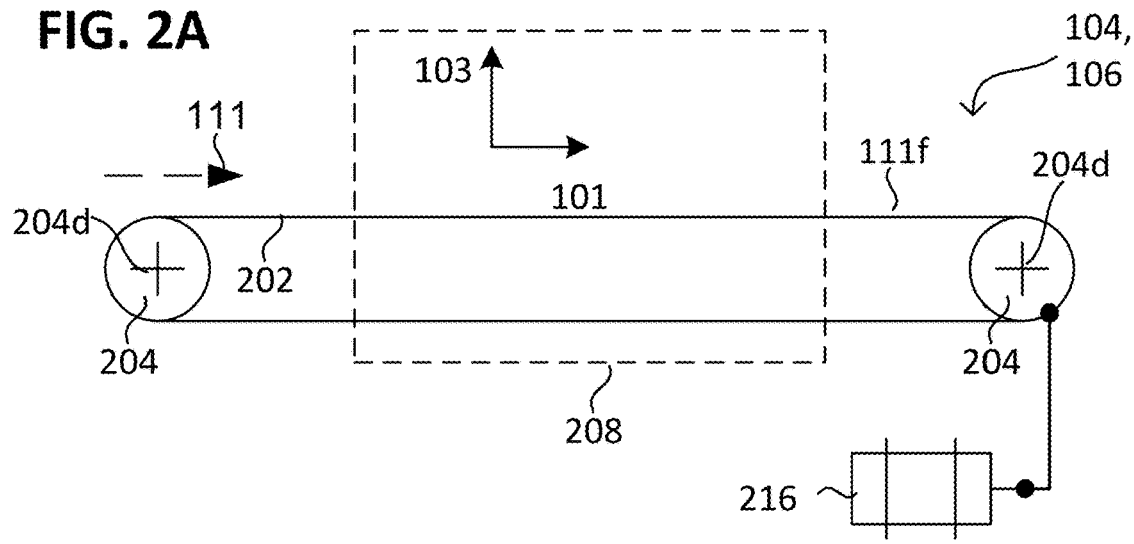
FIG. 2A shows a conveyor according to various embodiments in a schematic cross-sectional view or side view.

In the following detailed description, reference is made to the accompanying drawings, which form part of this description and in which specific embodiments in which the invention can be carried out are shown for purposes of illustration. In this respect, directional terminology such as for instance "at the top", "at the bottom", "at the front", "at the rear", "front", "rear", etc. is used with reference to the orientation of the figure(s) described. Since components of embodiments may be positioned in a number of different orientations, the directional terminology serves for purposes of illustration and is in no way restrictive. It goes without saying that other embodiments may be used and structural or logical changes made without departing from the scope of protection of the present invention. It goes without saying that the features of the various embodiments described herein by way of example can be combined with one another, unless otherwise specifically stated. The following detailed description is therefore not to be interpreted in a restrictive sense, and the scope of protection of the present invention is defined by the appended claims.

In the course of this description, the terms "connected" and "coupled" are used for describing both a direct connection and an indirect connection (for example resistive and/or electrically conductive, for example an electrically conductive connection) and both a direct coupling and an indirect coupling. In the figures, identical or similar elements are provided with identical designations, wherever appropriate.

According to various embodiments, the term "coupled" or "coupling" may be understood in the sense of a (for example mechanical, hydrostatic, thermal and/or electrical), for example direct or indirect, connection and/or interaction. A number of elements may for example be coupled to one another along a chain of interaction. According to various embodiments, "coupled" may be understood in the sense of a mechanical (for example physical) coupling, for example by means of a direct physical contact. A coupling may be configured to transmit a mechanical interaction (for example force, torque, etc.).

According to various embodiments, a transporting system may have a number of the transporting arrangements described herein (for example for selecting), to which the transporting system branches. The transporting system may have a sensor arrangement (for example having one or more sensors) and a control arrangement (for example having one or more pivoting control devices). The transporting arrangements and/or their component parts (for example distributing conveyors and associated pivoting control device) may be distributed over the entire transporting system and communicate with one another, for example by means of corresponding signals. For example, a number of transporting arrangements may commonly use the sensed properties of the container.

For example, all of the component parts of the transporting system may communicate with one another or they may be formed as grouped into autonomous functional units that do not communicate with one another. In an empty-container accepting arrangement for example a first sensor and/or a first control device of the transporting system may be part of the taking-back machine. Further sensors and/or control devices may be arranged at points at which the empty containers are to be distributed, i.e. the transporting system branches.

According to various embodiments, a selecting arrangement may be configured to categorize the empty containers, i.e. assign them a category. The category of each empty container (or container) may optionally be stored (for example centrally), and the distribution of the empty containers may take place according to that category (also referred to as sorting). For example, empty containers of a predefined category (for example satisfying the criterion) may be separated out from a stream of empty containers that is being taken along by means of the transporting arrangement and distributed by means of the distributing conveyor to the first transporting level or the second transporting level arranged above it.

The categorizing may generally take place on the basis of various properties of the empty containers, for example their color property (which for example represents their optical spectrum and/or color stimulus, for example in graphic terms their color) and/or logo, their shape, the state in which they are sold, their size, their material (for example chemical composition), their type of container, (for example single-use or multi-use) and/or their weight. The sensor arrangement may be configured to sense the properties of the empty containers that are required for categorizing (for example the storage container and/or the empties container).

The empty containers (or in other words one or more container(s)) may be understood in the context as meaning emptied sales packaging and/or sales containers, such as for instance single-use bottles, single-use returnable bottles, beverage cans, beverage containers, multi-use bottles and the like, or empty-container storage containers, such as for instance a beverage crate. The empty containers may also comprise a multipack, i.e. a unit made up of a number of containers together, for example a storage container (for example an empties crate) in which optionally smaller containers (for example bottles) or other empty containers may be arranged.

If a degree of filling (also referred to as filling state) of a storage container, for example an empties crate, satisfies the criterion, for example is less than a threshold value (for example which can be set), for example less than 70%, the crate may also be taken out from the stream of empty containers (in graphic terms ejected), for example in that the distributing conveyor is brought into a corresponding position and/or by means of a diverter, for "manually" adding additional empty containers to the empty-container container (for example for filling an empties crate with bottles).

The degree of filling may be understood as meaning the proportion of the storage container that is occupied by empty containers, for example as the number of places for empty containers in the storage container that are occupied by empty containers.

The empty-container taking-back system may for example be part of an empty-container return chain, which sends the empty containers for example for reuse or recycling (for example for the recovery of raw materials).

According to various embodiments, the distributing conveyor (for example in graphic terms a pivotable belt conveyor) may be arranged at any desired point of an empty-container crate transporting process, for example about 2 to 4 m downstream of the reverse vending machine, and may sort in the material flow (the stream of empty containers) into a number of (for example two or three) different transporting levels (for example backup levels).

For example, a purely backing-up function may be provided. There may be the option of selecting a crate backup level, which is loaded up with crates until the backup level is full. In that case, the backup level may have a sensor, which senses a filling state of the backup level, the pivoting being able to take place if the filling state of the backup level satisfies a predetermined criterion. For example, the change to a next backup level takes place if the filling state of the backup level satisfies the predetermined criterion.

According to various embodiments, the distributing conveyor (for example by means of the eccentric lifting gear mechanism) can achieve up to 750 pivoting movements (in graphic terms changes of the transporting level) or more per hour, i.e. it can perform the distribution of at least >450 empty container items (for example empties crates) per hour, for example the feeding conveyor can sort without any problem into at least 2 transporting levels (for example backup levels), for example at least 1000 empty container items per hour, for example at least 1500 empty container items per hour.

According to various embodiments, the distributing conveyor (for example a pivotable belt conveyor with an eccentric lift) is capable on account of its speed during the quick changing of levels for sorting empty containers (for example empties crates) of changing the levels when there is a gap (for example 50 cm between two empties crates) in the stream of empty containers (in graphic terms material flow) (which for example makes it possible to avoid "stop&go" transport, i.e. discontinuous transport).

According to various embodiments, a sorting method may be provided by way of light barriers and/or scanning the height of the empty containers (for example the empties crates). For example, heavy container loads (for example crates) may be distributed to an upper backup level. By means of the at least one physical property, for example the weight, the accuracy of the distribution can be increased. For example, it is not always possible just on the basis of the height of the empty containers to deduce their weight (for example, the accuracy rate may be about 30%-40% or less).

According to various embodiments, at least one of the following is provided: strictly/well preselected empty containers (for example empties crates); quickly/easily palletizable empty containers; improved workplace ergonomics; heavy container loads (for example crates) are ordered to go to the upper transporting level, better handling of heavy container loads (for example crates), weight criterion (for example >x kg) can be set, reduction of sickness levels, comfortable relocation of the empty containers (for example empties crates) may mean that employees suffer less back strain, and/or variable response to amended health regulations. Alternatively or in addition, the operating mode according to which the distribution takes place by means of the distributing conveyor may be set and/or changed over. For example, a possibility for setting a distribution criterion or a number of distribution criteria may be provided (in graphic terms, shorter people could possibly prefer to take out the heavy crates from the lower transporting level).

FIG. 1A illustrates a transporting arrangement 100a according to various embodiments in a schematic cross-sectional view or side view (for example transversely in relation to the transporting direction 111).

The transporting arrangement 100a may be configured to transport a container 13 (for example a single empty container or an empties crate) in a transporting direction 111 along a transporting path, which is defined by means of the distributing conveyor 106. The distributing conveyor 106 may be arranged between the feeding conveyor 104 and the multi-level transporting section 102.

The feeding conveyor 104 may be configured to transport the container 13 in the transporting direction 111 to the multi-level transporting section 102 and the distributing conveyor 106.

For example, the feeding conveyor 104 (for example comprising or formed by a preliminary band 104) may have a transporting area that is horizontal at least in certain portions (for example provided by means of an upper strand), which facilitates transport over greater distances. Alternatively or in addition, the feeding conveyor 104 may have a transporting area that is inclined at least in certain portions (i.e. not horizontal) (for example provided by means of an upper strand), for example rising in the direction of the distributing conveyor 106 and/or adjoining and/or at least close to the distributing conveyor 106. In this way a transition from the feeding conveyor 104 to the distributing conveyor 106 can be smoother, i.e. the maximum difference between the transporting directions of the feeding conveyor 104 and the distributing conveyor 106 can be reduced. This makes transport easier, for example of large and/or heavy containers 13, and/or reduces loads on the respective conveyors 104, 106. For example, an angle between the transporting area of the feeding conveyor 104 and the horizontal may be less than an angle by which the distributing conveyor 106 is pivotable 106s, and/or be in a range from approximately 2° to approximately 15°, for example in a range from approximately 5° to approximately 10°, for example approximately 7°.

The multi-level transporting section 102 may have a first transporting level 102a and a second transporting level 102b arranged above it (e.g., thereover, in other words over the first transporting level 102a). The first transporting level 102a and/or second transporting level 102b may for example be configured as a backup level.

A backup level may provide a receiving space in which a number of containers 13 are collected. By means of the backup level, a transport buffer may for example be provided and/or the transporting movement of the containers may be slowed down (or stopped), which facilitates their removal by hand. For example, the backup level may form the end of a transporting path.

For example, the first transporting level 102a and/or second transporting level 102b (for example comprising or formed by a roller track) may have a transporting area that is horizontal at least in certain portions (for example provided by means of a number of transporting rollers), which facilitates transport over greater distances. Alternatively or in addition, the first transporting level 102*a* and/or second transporting level 102*b* may have a transporting area that is inclined at least in certain portions (for example provided by means of a number of transporting rollers), for example rising in the direction of the distributing conveyor 106 (in graphic terms, providing a gradient in the transporting direction) and/or adjoining or at least close to the distributing conveyor 106. By means of the gradient, a downhill force (for example in the transporting direction) can be provided, which facilitates the transport of the container 13. This makes transport easier, for example of large and/or heavy containers 13, and/or allows the first transporting level 102*a* and/or second transporting level 102*b* to be formed in a driveless manner. For example, an angle between the transporting area (of the first transporting level 102*a* and/or second transporting level 102*b*) and the horizontal may be less than an angle by which the distributing conveyor 106 is pivotable 106*s*, and/or be in a range from approximately 0.5° to approximately 5°, for example in a range from approximately 2° to approximately 3°.

Alternatively or in addition to the transporting area that is inclined in certain portions (for example of the first transporting level 102*a* and/or second transporting level 102*b*), the corresponding portion of the transporting area, for example adjoining or at least close to the distributing conveyor 106, may also be driven (for example provided by means of a belt conveyor, also referred to as an intermediate belt conveyor), i.e. the portion of the first transporting level 102*a* or second transporting level 102*b* may be coupled to a drive. This facilitates the transition from the distributing conveyor 106 to the first transporting level 102*a* or second transporting level 102*b*. For example, this may be conducive to (for example for ensuring) reliable further transport of the crates between the distributing conveyor 106 (also referred to as the pivoting element) and a portion, for example a non-driven portion, of the first transporting level 102*a* or second transporting level 102*b* following in the transporting direction.

The distributing conveyor 106 may be mounted (e.g., beared) pivotably 106*s* into a first position 106*a* (also referred to as first pivoting position 106*a*, in graphic terms a lower position) and a second position 106*b* (also referred to as second pivoting position 106*b*, in graphic terms an upper position), i.e. be relocated by means of a pivoting movement 106*s* between the first position 106*a* and the second position 106*b* (more generally: between a number of positions 106*a*, 106*b*), for example from the first position 106*a* into the second position 106*b*, or vice versa.

For example, an angle (also referred to as the pivoting angle) may be formed between the mutually adjacent positions of the number of positions 106*a*, 106*b* in a range from approximately 10° to approximately 20°, for example approximately 16°. Optionally, the pivoting angle may go over the horizontal, for example the horizontal may be parallel to the angle bisector of the pivoting angle.

The distributing conveyor 106 may have a pivoting axis 106*w*, about which the pivoting movement 106*s* takes place. The pivoting axis 106*w* may be arranged closer to the feeding conveyor 104 than to the multi-level transporting section 102.

Optionally, the properties of the pivoting movement 106*s* may be configured such that they can be set and/or changed over. For example, a number of pivoting movement modes (also referred to as operating modes) of the distributing conveyor 106 according to which the pivoting 106*s* takes place may be provided.

For example, a speed (also referred to as the pivoting speed, for example given as the change of position (also referred to as the change of transporting level) per time or given as the average angular velocity) of the pivoting movement 106*s* may be configured such that it can be set and/or changed over, for example between at least two different speeds. For example, at least some of the number of operating modes according to which the pivoting 106*s* takes place may be differentiated in at least the pivoting speed.

For example, the transporting arrangement 100*a* (for example its feeding conveyor 104) may be configured to transport the container 13 and at least one additional container 23 immediately following it (also compare FIG. 1B), for example continuously, with a transporting speed v and a distance d (in graphic terms a gap) from one another. The container 13 and the at least one additional container 23 immediately following it may be part of a stream of containers (also referred to as a stream of empty containers), which comprises a large number of containers 13, 23. The or each container of the stream of containers 13, 23 may for example be at the distance from the additional container(s) that is respectively adjacent to it of the stream of containers between which the container is for example arranged.

The transporting speed v and the distance d of the containers 13, 23 from one another gives a time period t, between the containers 13, 23, in which a change of position, for example a change (also referred to as the change of transporting level) between the number of positions 106*a*, 106*b*, for example between the first position 106*a* and the second position 106*b*, can take place without the continuous transport having to be interrupted. In graphic terms, the pivoting between the number of positions can take place and/or be completed between two successive containers 13, 23. The time period t may be the quotient of the distance d and the transporting speed v.

The transporting speed v and the distance d may for example be predetermined for the pivoting control device 110, for example if they are for example given by a setting of the transporting arrangement 100*a* and/or for example are adjustable. Alternatively or in addition, the transporting speed v and/or the distance d may be predetermined by the pivoting control device 110, for example on the basis of a predefined time period t, or be determined by the latter.

For example, the pivoting control device 110 may be configured to pivot the distributing conveyor 106 between the number of transporting levels 102*a*, 102*b*, for example the first transporting level 102*a* and the second transporting level 102*b*, within a time period t. In other words, the duration of the pivoting 106*s* or of the pivoting movement 106*s* (also referred to as the pivoting interval) may be less than the quotient of the distance d and the transporting speed v.

For example, the distance d may be in a range from approximately 20 cm (centimeters) to approximately 1 m (meter), for example in a range from approximately 30 cm to approximately 60 cm, for example approximately 50 cm. Alternatively or in addition, the transporting speed v may be in a range from approximately 0.01 m/s to approximately 1 m/s, for example greater than or equal to 0.02 m/s, for example in a range from approximately 0.02 m/s to approximately 0.5 m/s, for example greater than or equal to 0.05 m/s, for example in a range from approximately 0.05 m/s to approximately 0.2 m/s.

For example, the time period t and/or the pivoting interval may be less than approximately 10 s (seconds), for example less than approximately 7.5 s, for example less than approximately 5 s, for example less than approximately 4 s, for example less than approximately 3 s, for example less than approximately 2 s. Alternatively or in addition, the number of changes between two positions of the number of positions 102a, 102b (also referred to as the change of transporting level) and/or of pivoting movements may be greater than approximately 350 per hour (corresponds to approximately 0.1/s), for example greater than approximately 500 per hour (corresponds to approximately 0.14/s), for example greater than approximately 750 per hour (corresponds to approximately 0.2/s), for example greater than approximately 1000 per hour (corresponds to approximately 0.28/s), for example greater than approximately 1500 per hour (corresponds to approximately 0.41/s), for example greater than approximately 1800 per hour (corresponds to approximately 0.5/s).

By means of the pivoting movement 106s, the container 13 can be distributed to the first transporting level 102a or the second transporting level 102b. The distributing conveyor 106 may be configured to provide in the first position 106a a first transporting path 111a to or together with the first (for example lower) transporting level 102a and in the second position 106b a second transporting path 111b to or together with the second transporting level 102b.

The sensor arrangement 108 may be configured to sense 108e at least one (i.e. precisely one or more than one) physical property of the container 13, for example its weight, its color property, its filling state, its size, its material, its shape and/or an identification (if present) arranged on it (for example logo), for example a logo applied to the container 13 (for example a crate). Generally, the color property may represent the spectral composition of the light emanating from the container 13 (for example passing through it and/or emitted by it), for example its color stimulus, its transmission spectrum and/or its re-emission spectrum, for example caused by the identification. The color property may for example give the proportion of the optical wavelengths in the spectral composition and/or a point in the color space. However, other ways of characterizing the color property may also be used.

The sensor arrangement 108 may for example have at least one sensor region 208 (also compare FIG. 2A), i.e. a region 208 in which the sensor arrangement 108 is configured to sense 108e the physical property. For example, the first sensor region of the sensor arrangement 108 may be arranged in such a way that a container 13 arranged on the feeding conveyor 104 can be sensed by means of the sensor arrangement 108. Alternatively or in addition, a second sensor region of the sensor arrangement 108 may be arranged in such a way that a container 13 arranged on the distributing conveyor 106 can be sensed by means of the sensor arrangement 108.

On the basis of the at least one physical property, it is possible for example to deduce a logistical property, such as for example the type of container and/or the type of return, of the container 13. Generally, a number of properties (for example at least one physical property and/or at least one logistical property) of the container may represent one another (for example bidirectionally). In other words, on the basis of precisely one or more property of the container as a first (for example physical) property of the container 13 it is possible to deduce precisely one or more property as a second (for example physical and/or logistical) property of the container, and vice versa.

For example, a physical property and a logistical property may represent one another, such as for example the type of container and at least one physical property of the container 13 from the following group: color property, size, empty weight, shape and/or material. Alternatively or in addition, two physical properties may represent one another, such as for example the material and the color property or else for example the material and the weight. Similarly, mixed properties of the container may represent one another, for example the weight in combination with the type of container may together represent the filling state, and vice versa. The sensed weight of the container may for example differ from its empty weight, and consequently allow its filling state to be deduced.

According to various embodiments, the distributing conveyor 106 may provide in the first position 106a and/or in the second position 106b a sloping (i.e. at an angle to the horizontal) transporting direction or transporting level. Alternatively, the distributing conveyor 106 may provide in the first position 106a and/or in the second position 106b a horizontal transporting direction or transporting level.

Optionally, the sensor arrangement 108 may be configured to sense the transporting speed v and/or the distance d. Alternatively, the transporting speed v and/or the distance d may be global parameters of the transporting arrangement 100a, which are predetermined for the pivoting control device 110. For example, the pivoting control device 110 may be configured to determine the time period t on the basis of the transporting speed v and/or the distance d.

Optionally, the sensor arrangement 108 may be configured to sense the presence of the container 13 on the respective conveyor 104, 106 by means of the sensor arrangement 108 and determine on this basis, for example using the transporting speed v, a point in time at which a container 13, 23 leaves the distributing conveyor 106 in the direction of the multi-level transporting section 102.

The pivoting control device 110 may for example be configured to carry out (i.e. to complete) the pivoting movement 106s within the time period t and/or to begin it at the point in time at which a container leaves the distributing conveyor 106 in the direction of the multi-level transporting section 102. In this way, the pivoting can take place without the transport having to be interrupted, i.e. without requiring discontinuous transport. In other words, the transport of the container 13 can take place continuously while the pivoting 106s is taking place.

The pivoting control device 110 may be configured to pivot 106s the distributing conveyor 106 between the first position 106a and the second position 106b, for example according to the set operating mode. The pivoting movement 106s, i.e. the change (also referred to as the change of transporting level) between the first position 106a and the second position 106b may take place for example if the at least one property of the container 13 satisfies a predetermined criterion. The criterion may for example define at least one (i.e. precisely one or more than one) threshold value for the at least one property, the criterion being satisfied if the property exceeds or does not reach this threshold value. For example, at least one threshold value may delimit at least one range (also referred to as the predetermined range) in the upward and/or downward direction (for example the range lying between two threshold values), so that the criterion is satisfied if the property lies in the predetermined range.

In graphic terms, a classification of the container 13 may take place on the basis of the at least one physical property of the container 13, for example as "to be transported to the second transporting level 102b" (for example if the criterion is satisfied) and "to be transported to the first transporting level 102a" (for example if the criterion is unsatisfied), or vice versa.

Alternatively or in addition to the pivoting speed, at least some of the number of operating modes according to which the pivoting 106s takes place may be differentiated in at least the criterion.

For example, the pivoting movement 106s may take place if the at least one property does not reach (or exceeds) a threshold value of the at least one threshold value and/or lies within (or outside) a range of the at least one predetermined range. The criterion may for example define a number of threshold values, some of which must be exceeded and/or some of which must not be reached in order to satisfy the criterion.

The criterion may for example define a weight threshold value. The pivoting control device 110 may be configured in such a way that a container 13 of which the weight exceeds the weight threshold value and/or lies outside a predetermined weight range is transported in the second position 106b or to the second transporting level 102b. This can make it easier for example to transport the container further, in particular if it is removed by hand from the second transporting level 102b. For example, health regulations may be taken into account by means of the criterion. Optionally, the pivoting control device 110 may also be configured in such a way that the container 13 of which the weight exceeds the weight threshold value or lies outside a predetermined weight range is also transported in the first position 106a or to the first transporting level 102a, if required.

Alternatively or in addition, a container 13 of which the filling state exceeds a filling state threshold value or lies outside a predetermined filling state range may be transported either to the first transporting level 102a or to the second transporting level 102b. For example, empty containers categorized as sufficiently filled, for example as "full", may be transported to a lower transporting level 102a and empty containers categorized as insufficiently filled, for example as "empty", may be transported to an upper transporting level 102b (which makes it easier to fill the insufficiently filled empty containers) or vice versa (which in turn makes it easier to comfortably relocate the full, and consequently heavy container loads).

Alternatively or in addition, a container 13 of which the size (for example height and/or width) exceeds a size threshold value or lies outside a predetermined size range may be transported either to the first transporting level 102a or to the second transporting level 102b.

Alternatively or in addition, a container 13 of which the proportion of a material (for example of a type of material, such as metal, glass and/or plastic) exceeds a material threshold value or lies outside a predetermined material range may be transported either to the first transporting level 102a or to the second transporting level 102b.

In an analogous way, a container 13 may be transported either to the first transporting level 102a or to the second transporting level 102b on the basis of its color property and/or its shape.

Optionally, the multi-level transporting section may have at least one additional transporting level, for example an additional second transporting level, as described more precisely later, and also optionally a third transporting level 102c and/or (i.e. alternatively or in addition) an additional third transporting level 102d (also compare FIG. 3).

The third transporting level 102c may for example be arranged under the first transporting level 102a. The additional third transporting level 102d may be arranged above the second transporting level.

The pivoting control device 110 may be configured to pivot the distributing conveyor 106 into a first position (also referred to as the third pivoting position), in which the distributing conveyor 106 provides a third transporting path to or together with the third transporting level 102c. Alternatively or in addition, the pivoting control device 110 may be configured to pivot the distributing conveyor 106 into an additional third position (also referred to as the third pivoting position), in which the distributing conveyor 106 provides an additional third transporting path to or together with the additional third transporting level 102d.

For example, when the transporting arrangement 100a has been installed (for example on a base) (for example as operationally ready), the first transporting level 102a or the optional third transporting level 102c may be arranged under the second transporting level 102b in the direction of gravity. In other words, the first transporting level 102a or the optional third transporting level 102c may be arranged between the second transporting level 102b and the base. In this case, the pivoting movement 106s may take place about a substantially horizontal pivoting axis 106w.

FIG. 1B illustrates a transporting arrangement 100b according to various embodiments in a schematic cross-sectional view or side view (for example transversely in relation to the transporting direction 111). The transporting arrangement 100b may be configured like the transporting arrangement 100a.

According to various embodiments, the pivoting control device 110 may have a movement gear mechanism 110g (also referred to as a lifting gear mechanism 110g, for example in the broadest sense, that is to say also including for example a toggle-lever mechanism or other correspondingly set-up gear mechanisms), by means of which a rotational movement can be converted into a translational movement (in graphic terms the lift) that brings about the pivoting movement 106s of the distributing conveyor 106 (also referred to as a mechanical converter 110g). In other words, the movement gear mechanism 110g may be configured to convert this input torque into a translational force that brings about the pivoting movement 106s of the distributing conveyor 106. The translational force or movement may make a quick pivoting movement 106s possible.

FIG. 2A illustrates a conveyor 104, 106, for example the feeding conveyor 104 and/or the distributing conveyor 106, according to various embodiments in a schematic cross-sectional view or side view (for example transversely in relation to the transporting direction 111).

The conveyor 104, 106 (i.e. the feeding conveyor 104 and/or the distributing conveyor 106) may comprise or be formed by a driven (also referred to as active) belt conveyor (also referred to as a band conveyor) and/or chain conveyor. The band conveyor may for example have a transporting band 202 (also referred to as a conveyor belt), for example a belt, a chain band or the like, on which the container 13 is transported. The chain conveyor may for example have one or more chain strands 202 (for example mounted by means of drive sprockets), on which the container 13 is transported.

The transporting band may be supported by means of a number of transporting rollers 204 (also referred to as carrying rollers), of which at least one transporting roller 204 may be coupled to a drive. Alternatively or in addition, the conveyor 104, 106 may have a driven roller conveyor (also compare FIG. 2B), which has a large number of transporting rollers 204. For driving the conveyor 104, 106, it may have a conveyor drive 216, which is coupled to each driven transporting roller 204 of the conveyor 104, 106.

The number of transporting rollers 204 or the transporting band 202 (or its upper strand) may provide a transporting area 111f, on which the container 13 (i.e. the empty container 13) is transported in the transporting direction 111. Alternatively or in addition, still other types of active conveyor that are suitable for transporting the container 13 may be used.

Each transporting roller of the number of transporting rollers 204 may be mounted rotatably about an axis of rotation by means of a rotary bearing. The number of transporting rollers 204 may for example have a lateral surface area on which the transporting band or the container 13 lies.

Figure 2B:
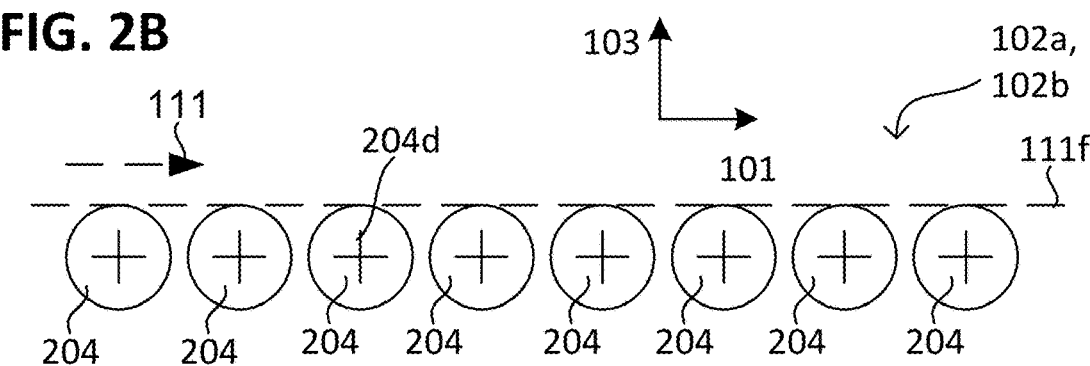
FIG. 2B shows a transporting level according to various embodiments in a schematic cross-sectional view or side view.

FIG. 2B illustrates a transporting level 102a, 102b, for example the first transporting level 102a and/or the second transporting level 102b, according to various embodiments in a schematic cross-sectional view or side view (for example transversely in relation to the transporting direction 111).

The transporting level 102a, 102b (i.e. the first transporting level 102a and/or the second transporting level 102b) may have an undriven (also referred to as passive) roller conveyor, which has a large number of transporting rollers 204. The number of transporting rollers 204 may provide a transporting area 111f, on which the container 13 (i.e. the empty container 13) is transported in the transporting direction 111. Alternatively or in addition, still other types of passive conveyor that are suitable for passively transporting the container 13 may be used.

For example, the transporting area 111f of the transporting level 102a, 102b may be sloping (i.e. at an angle in relation to the horizontal, also referred to as the angle of inclination), for example inclined downwardly away from the distributing conveyor 106. In this way, a downhill force can be provided for the container 13. By means of the downhill force it is possible to achieve the effect that the conveyor 13 lying on the transporting level 102a, 102b is transported by itself (i.e. passively). In this way it is possible to dispense with a drive, which saves costs.

Figure 2C:
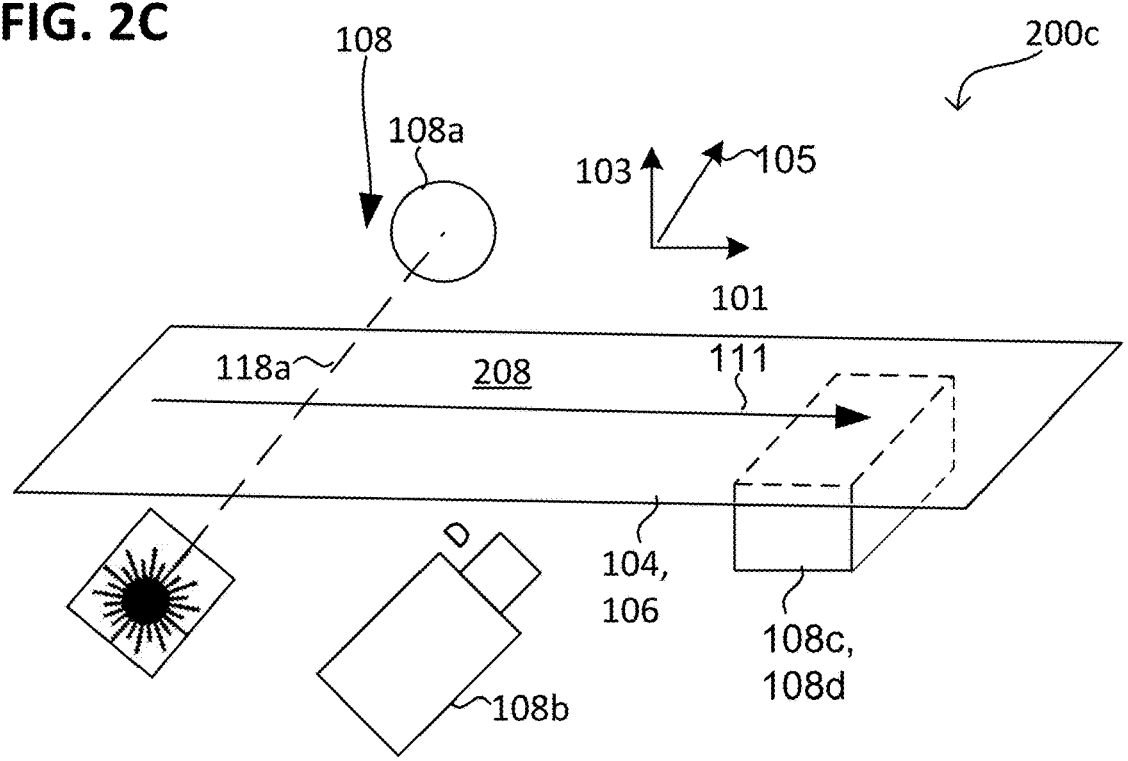
FIG. 2C shows a transporting arrangement according to various embodiments in a schematic perspective view.

FIG. 2C illustrates a transporting arrangement 200c according to various embodiments in a schematic perspective view (for example transversely in relation to the transporting direction 111).

The sensor arrangement 108 may for example have at least one optical sensor 108a, 108b, for example a light barrier 108a and/or a camera 108b. The light barrier 108a may for example generate a light beam 118a, which is directed through the (for example first and/or second) sensor region 208. The camera 108b may for example be directed with its lens toward the (for example first and/or second) sensor region 208.

By means of the optical sensor 108a, 108b (for example the light barrier 108a and/or the camera 108b), for example the presence of a container 13 and/or its size (for example height and/or width) may be sensed. For example, the light barrier 118a may be interrupted if a container 13 passes the sensor region 208 and/or exceeds the size threshold value.

Alternatively or in addition, the at least one optical sensor 108a, 108b (for example the light barrier 108a and/or the camera 108b) may be configured to perform a transmission measurement, i.e. for sensing the electromagnetic radiation passing through the container 13, for example its optical spectrum or at least the proportion of at least one predetermined wavelength range. For example, a spectral analysis of the container 13 or a color analysis may take place by means of the at least one optical sensor 108a, 108b.

In the case of the light barrier 108a, for example the transmission of the light beam 118a of the light barrier 108a through the container 13 may be sensed. In the case of the camera 108b, for example an additional light source may be required, by means of which the container 13 can be transilluminated in the direction of the camera 108b. By means of the transmission measurement, for example the color property of the container 13, for example the proportion (also referred to as the transmittance) and/or the spectrum of the light passing through may be sensed.

Optionally, the filling state and/or the material of the container 13 can be deduced on the basis of the transmittance. In graphic terms, a fluid located in the container 13 and/or an opaque material may reduce the transmittance.

The camera 108b may also make it possible to sense other properties of the container 13. For example, the re-emission spectrum of the container 13 may be sensed by means of the camera 108b. For this purpose, an external light source may optionally be used, by means of which the container 13 can be irradiated from the direction of the camera 108b. Alternatively or in addition, a logistical property of the container 13 may be sensed by means of the camera, for example its type of container and/or its type of return. For example, the logistical property may be sensed by means of reading a barcode of the container 13 and/or by means of a pattern recognition on the basis of the container 13.

Alternatively or in addition to the sensing of the color property of the container 13 (for example its color stimulus) by means of the at least one optical sensor 108a, 108b, the color property of the container 13 may already be sensed at the taking-back machine (for example a reverse vending machine). In that case, data that represent the color property of the container 13 may for example be processed centrally by means of an evaluation circuit (also referred to as a color sequence control). The result of the processing of the data may be provided for example to the pivoting control device 110.

Alternatively or in addition to the at least one optical sensor 108a, 108b, the sensor arrangement 108 may have at least one weight sensor 108c, 108d (for example at least one balance 108c, 108d), for example a first weight sensor 108c (for example a first balance 108c) and/or a second weight sensor 108d (for example a second balance 108f). According to various embodiments, the sensor arrangement 108 may have at least one weight sensor 108c, 108d, which is configured to sense a weight of a container 13 arranged on the feeding conveyor 104 or the distributing conveyor 106 (at least one property of the container 13 representing the weight).

Figure 3A:
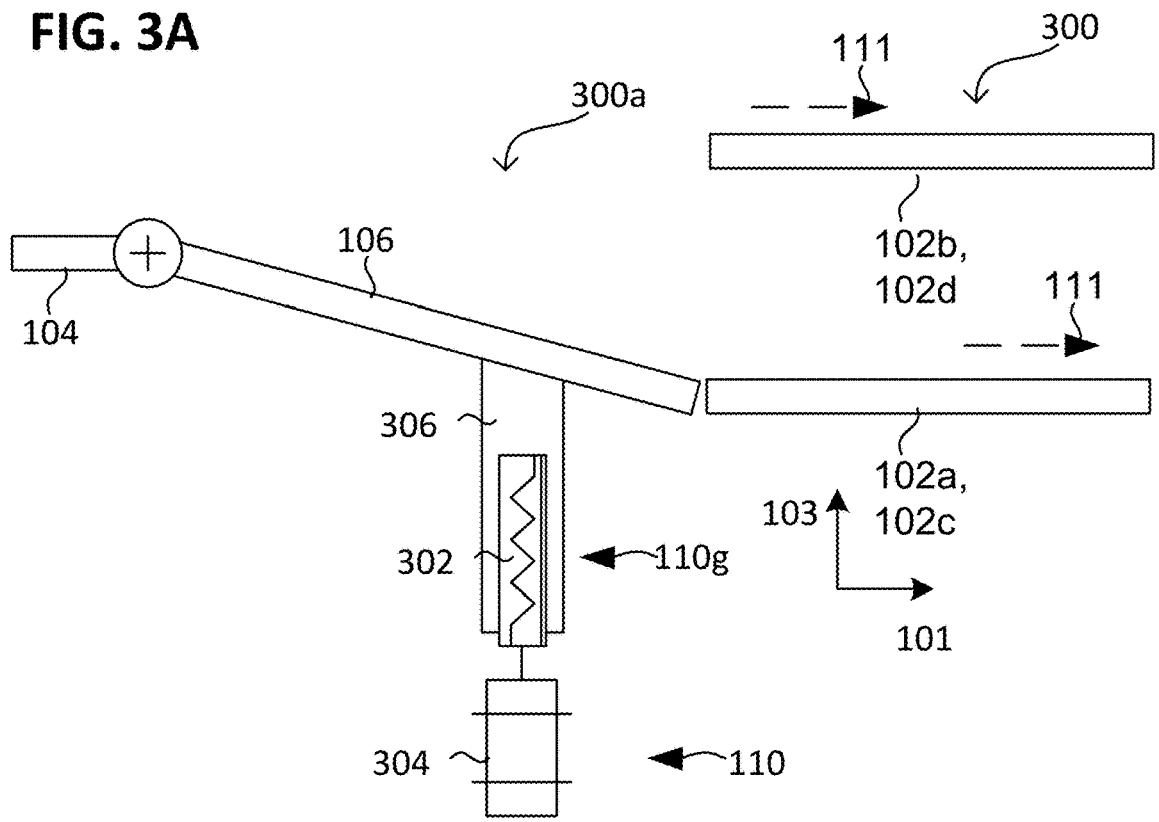
FIGS. 3A and 3B show a transporting arrangement according to various embodiments in a schematic cross-sectional view or side view.
Figure 3B:
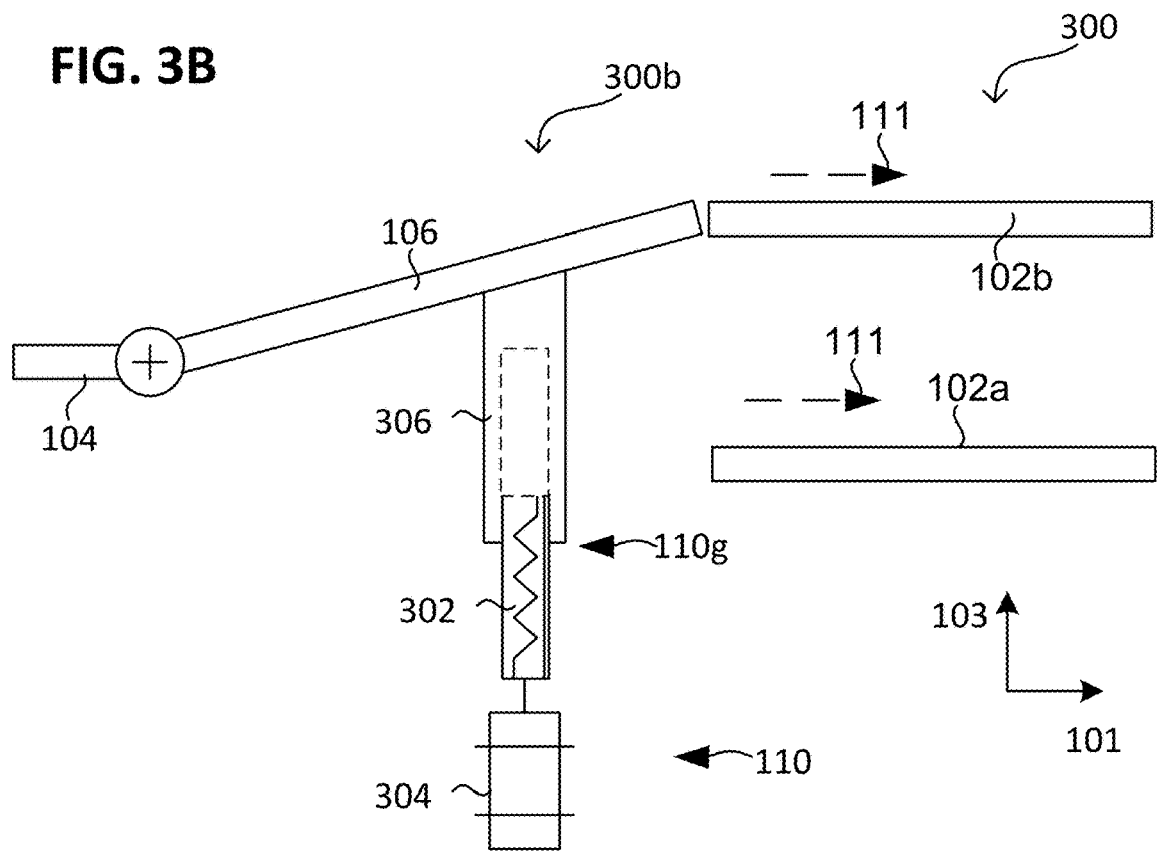

FIG. 3A and FIG. 3B illustrate a transporting arrangement 300 according to various embodiments in a schematic cross-sectional view or side view in a number of distributing configurations 300a, 300b. The transporting arrangement 300 may be configured like one of the transporting arrangements previously described, for example the transporting arrangement 100a or 100b. In a first distributing configuration 300a, the distributing conveyor 106 may be in the first pivoting position or the third pivoting position. In a second distributing configuration 300b, the distributing conveyor 106 may be in the second pivoting position or the additional third pivoting position.

The pivoting control device 110 may comprise or be formed by a spindle lifting gear mechanism 110g. The spindle lifting gear mechanism 110g may have a spindle 302 and a lifting arm 306, which engage in one another. The spindle 302 may be coupled to an electrical drive 304 of the pivoting control device 110. The lifting arm 306 may be coupled to the distributing conveyor 106.

By means of the drive 304, the rotational movement can be provided for the spindle gear mechanism 110g. By means of the lifting arm 306, the translational movement can be transferred to the distributing conveyor 106.

The drive 304 may for example have one or more electrical motors, for example servomotors (for example with a sensor for positional determination). In other words, the drive 304 may comprise or be formed by a servo drive. Each electrical motor may comprise or be formed by a DC motor, an asynchronous motor or a synchronous motor. However, other types of electrical motors may also be used.

Figure 4A:
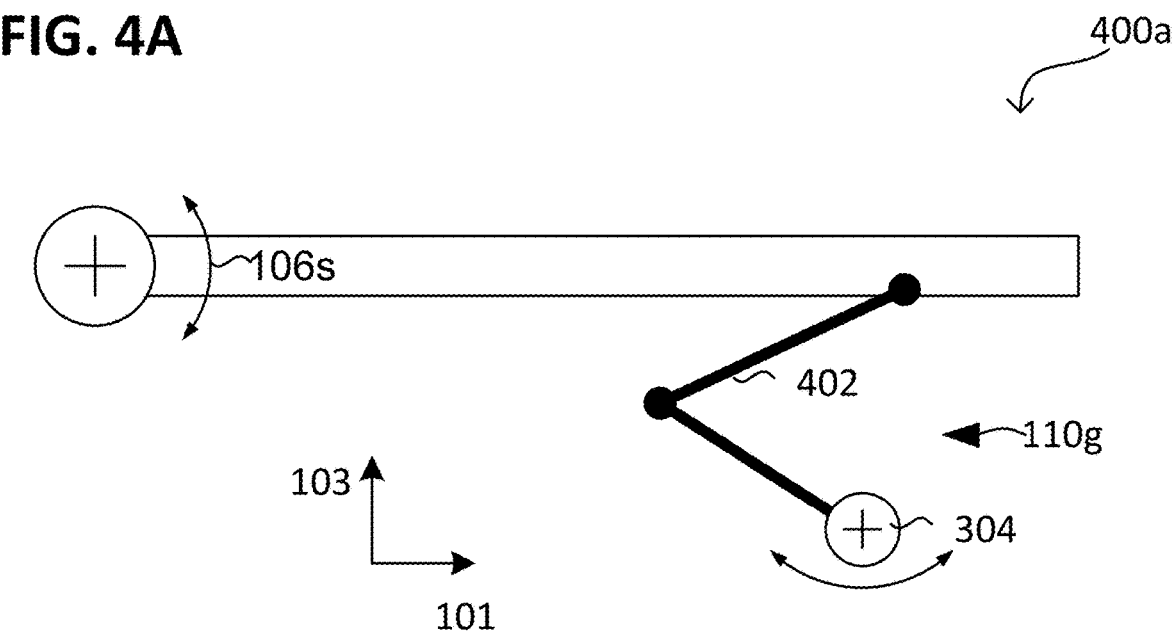
FIGS. 4A and 4B show in each case a transporting arrangement according to various embodiments in a schematic cross-sectional view or side view.
Figure 4B:
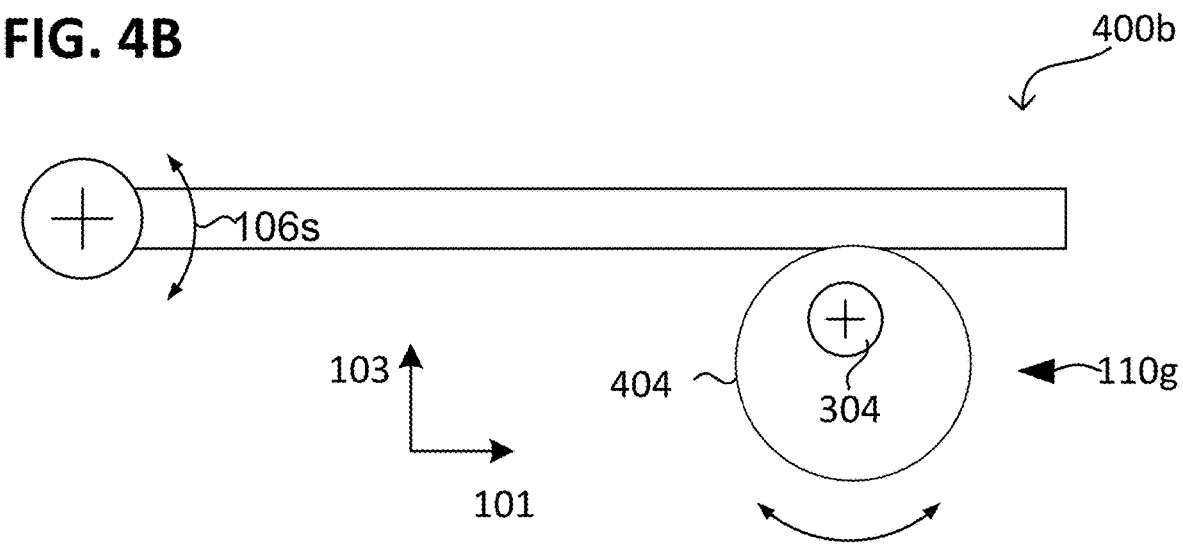

FIG. 4A and FIG. 4B illustrate a transporting arrangement 400a, 400b according to various embodiments in a schematic cross-sectional view or side view (for example transversely in relation to the transporting direction 111). The transporting arrangement 400a, 400b may be configured like the transporting arrangement 300, with the difference that the pivoting control device 110 of the transporting arrangement 400a has a toggle-lever lifting gear mechanism 110g and the pivoting control device 110 of the transporting arrangement 400b has an eccentric lifting gear mechanism 110g.

The toggle-lever lifting gear mechanism 110g may have a toggle lever mechanism 402, which couples the drive 304 to the distributing conveyor 106.

The eccentric lifting mechanism 110g may have an eccentric 404, which couples the drive 304 to the distributing conveyor 106. The eccentric 404 (also referred as to eccentric mechanism) may have a control disk, which is mounted at a shaft (concealed in the view, which is coupled to the drive 304) and the center point (for example center of gravity) of which lies outside the shaft axis. The circumference of the control disk may be circular, but does not necessarily have to be.

Figure 5A:
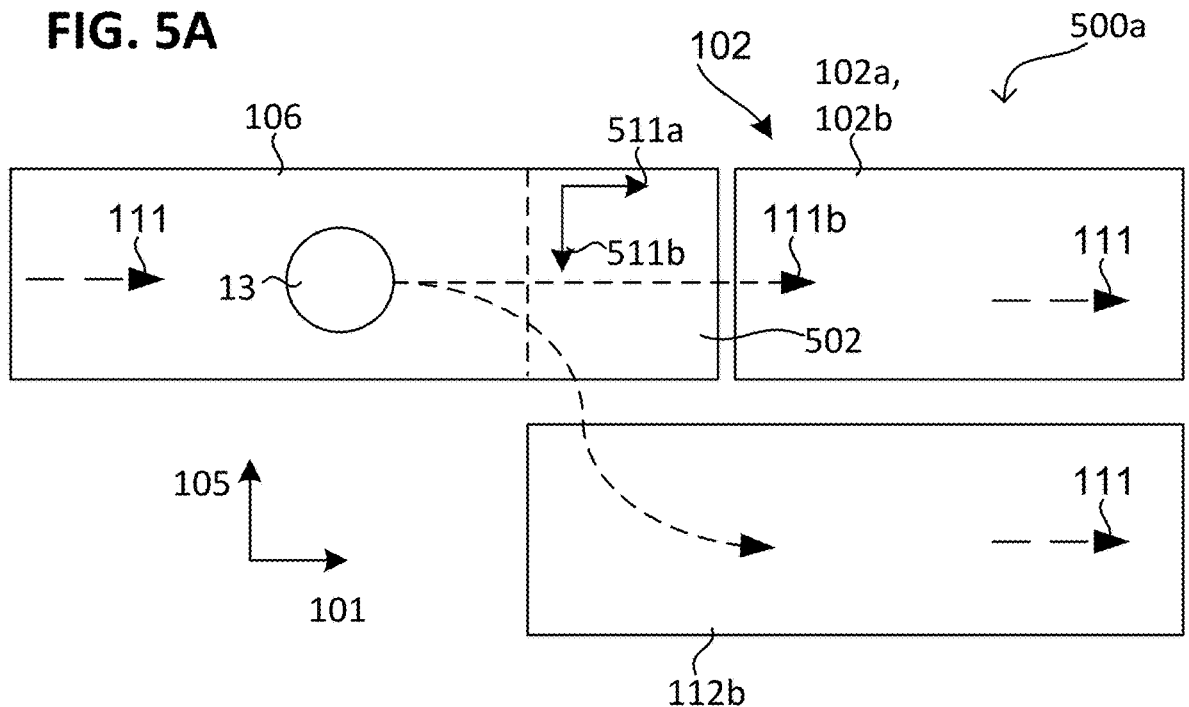
FIGS. 5A and 5B show in each case a transporting arrangement according to various embodiments in a schematic cross-sectional view or side view.
Figure 5B:
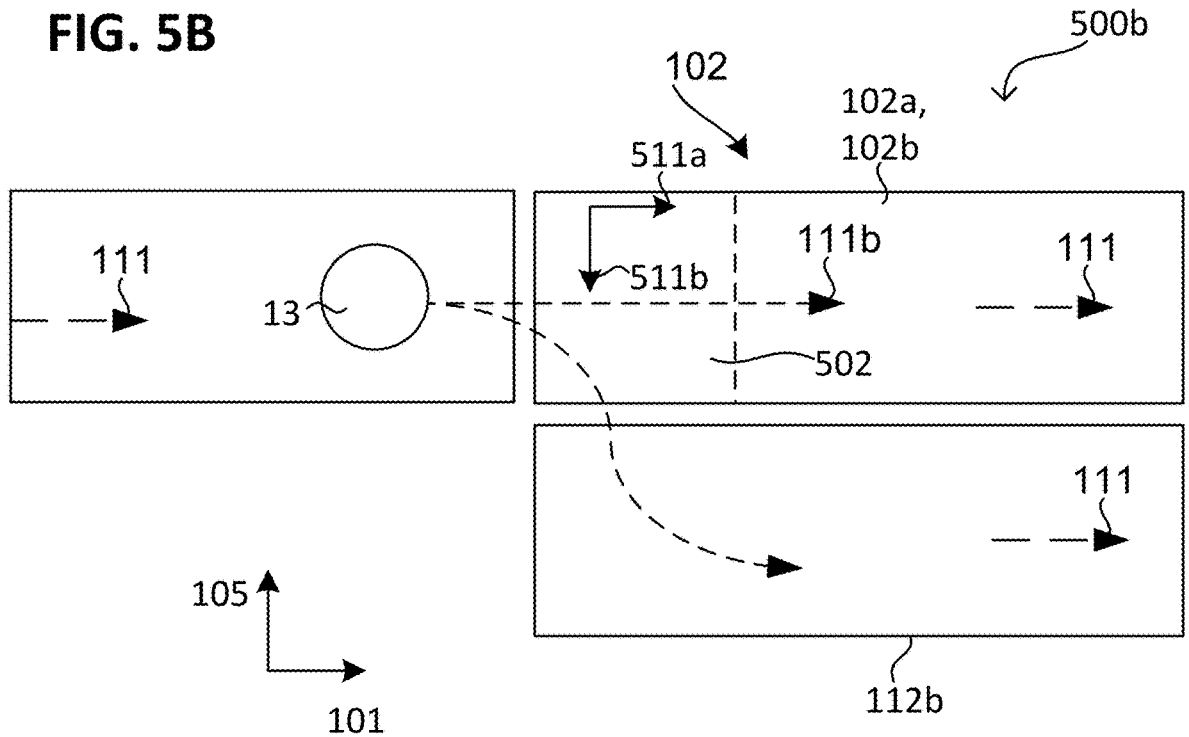

FIG. 5A and FIG. 5B illustrate in each case a transporting arrangement 500a, 500b according to various embodiments in a schematic plan view (for example as viewed in the direction of the transporting area 111f). The transporting arrangement 500a, 500b may be configured like one of the transporting arrangements previously illustrated, for example transporting arrangement 100a, 100b, 200c, 300, 400a or 400b.

According to various embodiments, the multi-level transporting section 102 may have an additional second transporting level 112b. The additional second transporting level 112b may be arranged on the distributing conveyor 106 at the height of the second transporting level 102b or at the height of the first transporting level 102a (for the sake of simplicity, referred to hereinafter as the primary transporting level 102a, 102b). Optionally, the additional second transporting level 112b (also referred to as the secondary transporting level 112a) and the primary transporting level 102a, 102b may differ in their angle of inclination.

Furthermore, the transporting arrangement 500a, 500b may have a horizontal distributing device 502 (also referred to more generally as a diverter 502, for example a horizontal diverter 502). The horizontal distributing device 502 may be configured to provide a first transporting direction 511a to the primary transporting level 102a, 102b in the first mode and to provide a second transporting direction 511b to the secondary transporting level 112b in the second mode. The first transporting direction 511a and the second transporting direction 511b may differ from one another (i.e. form an angle) and/or be horizontal (i.e. transversely in relation to the vertical).

The horizontal distributing device 502 of the transporting arrangement 500a may be integrated in the distributing conveyor 106 and/or at least be secured on it. The horizontal distributing device 502 of the transporting arrangement 500a may alternatively be integrated in the multi-level transporting section 102 and/or at least be secured on it, for example on the primary transporting level 102a, 102b (for example provide a driven portion).

The pivoting control device (not shown) may be configured to switch over the horizontal distributing device between the first mode and the second mode if the at least one property satisfies an additional predetermined criterion. In other words, the switching over of the horizontal distributing device 502, i.e. the change between the first mode and the second mode, may take place for example if the at least one property satisfies the additional predetermined criterion. The additional predetermined criterion may for example define at least one (i.e. precisely one or more than one) additional threshold value for the at least one property, the criterion being satisfied if the property exceeds or does not reach this threshold value. For example, the at least one additional threshold value may delimit at least one additional range (also referred to as the predetermined additional range) in the upward and/or downward direction (for example the range lying between the two additional threshold values), so that the criterion is satisfied if the property lies in the predetermined additional range.

For example, the switching over of the horizontal distributing device 502 takes place if the at least one property does not reach (or do not reach) a threshold value of the at least one additional threshold value and/or lies within (or outside) a range of the at least one predetermined additional range. The additional criterion may for example define the number of additional threshold values, some of which must be exceeded and/or some of which must be not reached in order to satisfy the additional criterion.

By analogy with the criterion previously described, the container 13 may on the basis of its size, its material, its filling state, its weight, its color property and/or its shape be transported either to the secondary transporting level 112b or to the primary transporting level 102a, 102b.

Alternatively or in addition, the at least one property may represent at least one type of the container.

Alternatively or in addition to the driven diverter 502, which is integrated in the multi-level transporting section 102 and or at least secured on it, the multi-level transporting section 102 may have a driven transporting portion 502 (for example provided by means of a belt conveyor), which is arranged on the distributing conveyor 106 (and for example only provides one transporting direction).

FIG. 6 illustrates a transporting arrangement 600 according to various embodiments in a schematic cross-sectional view or side view. The transporting arrangement 600 may be configured like one of the transporting arrangements previously illustrated, for example transporting arrangement 100a, 100b, 200c, 300, 400a or 400b.

The transporting arrangement 600 may have the third transporting level 102c.

As a difference from transporting arrangement 100, the third transporting level 102c may for example, as shown, be arranged under the distributing conveyor 106 or alternatively be arranged over the distributing conveyor 106 (not shown, in that case designated as an additional third transporting level 102d).

The feeding conveyor 104 may have an additional distributing conveyor 116. The additional distributing conveyor 116 may be configured like one of the distributing conveyors 106 previously described.

The additional distributing conveyor 116 may be mounted pivotably 116s into a first position (in graphic terms a lower position) and a second position (in graphic terms an upper position), i.e. be relocated by means of a pivoting movement 116s between its first position and second position, for example out of its first position into the second position, or vice versa. The additional distributing conveyor 116 may have a pivoting axis 116w, about which the pivoting movement 116s takes place.

By means of the pivoting movement 116s, the container 13 can be distributed to the distributing conveyor 106 or the third transporting level 102c. The additional distributing conveyor 116 may be configured to provide in the first position a first transporting path to or together with the distributing conveyor 106 and in the second position a second transporting path to or together with the third transporting level 102c.

The pivoting control device 110 may be configured to pivot the additional distributing conveyor 116 between its first position and its second position. The pivoting movement 116s, i.e. the change between its first position and its second position, may for example take place if the at least one property satisfies an additional predetermined criterion. The additional criterion may for example define at least one (i.e. precisely one or more than one) additional threshold value for the at least one property, the criterion being satisfied if the property exceeds or does not reach this threshold value. For example, the at least one additional threshold value may delimit at least one additional range (also referred to as a predetermined additional range) in the upward and/or downward direction (for example the range lying between two additional threshold values), so that the criterion is satisfied if the property lies in the predetermined additional range.

By analogy with the criterion previously described, the container 13 may on the basis of its size, its material, its filling state, its weight, its color property and/or its shape be transported either to the third transporting level 102c or to the distributing conveyor 106.

Figure 7:
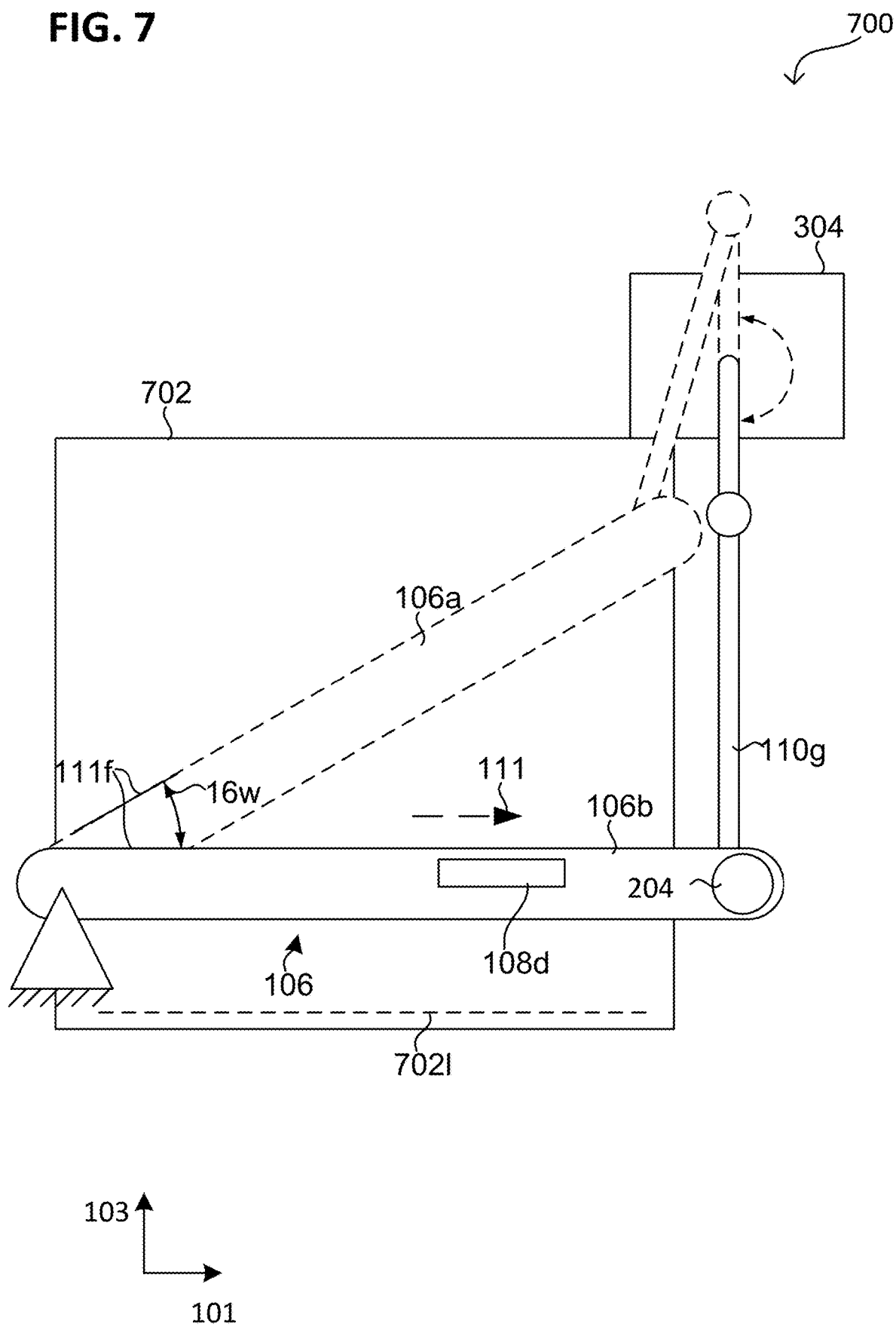
FIG. 7 shows a transporting arrangement according to various embodiments in various views.

FIG. 7 illustrates the transporting arrangement 700 according to various embodiments in a schematic perspective view. The transporting arrangement 700 may be configured like one of the transporting arrangements previously illustrated, for example transporting arrangement 100a, 100b, 200c, 300, 400a or 400b, with the difference that the drive 304 and/or the movement gear mechanism 110g is arranged above the distributing conveyor 106.

The movement gear mechanism 110g may, as shown, have a toggle-lever mechanism or alternatively the spindle or the eccentric, as previously described.

Furthermore, the transporting arrangement 700 may have a framework 702, which carries the distributing conveyor 106 and optionally the drive 304 and/or the movement gear mechanism 110g. The framework may optionally have at least one cable duct 7021, by means of which the drive 304 and/or the sensor arrangement 108 is electrically connected to a control circuit of the pivoting control device 110.

According to various embodiments, a width 801 (i.e. extent transversely in relation to the transporting direction 111 and parallel to the transporting area) of the distributing conveyor 106 may be in a range from approximately 1 m (meter) to approximately 3 m, for example in a range from approximately 1.5 m to approximately 2.2 m, for example approximately 1.7 m.

The upper-lying eccentric drive 304, 110g of the transporting arrangement 700 (or some other movement gear-mechanism drive 304, 110g according to various embodiments that is arranged as upper-lying) in graphic terms makes servicing easier by providing improved accessibility to the components for the service worker. However, the eccentric drive 304, 110g (or some other movement gear mechanism drive 304, 110g according to various embodiments) may also be arranged differently, for example as under-lying, and/or an upper-lying toggle-lever mechanism drive 304, 110g may also be used.

For example, the transporting area 111f of the distributing conveyor 106 may be pivoted between each of the adjacent positions of the number of positions 106a, 106b by an angle 16w (also referred to as the pivoting angle 16w) in a range from approximately 10° to approximately 20°, for example approximately 16°.

Optionally, the distributing conveyor 106 may have at least one weight sensor 108d (for example comprising or formed by a balance). For example, the at least one weight sensor 108d may be arranged between the upper strand and the lower strand of the distributing conveyor 106.

Optionally, at least the transporting area 111f (parallel to the side of the pivoting angle 16w) may in one position 106b of the number of positions 106a, 106b be parallel to the horizontal. If the transporting area 111f is parallel to the horizontal (for example in the position 106b), the sensing of the weight of a container transported by means of the distributing conveyor 106 can be made easier, since in this case the normal force corresponds to the weight, i.e. the dependence of the normal force on the pivoting angle 16w does not have to be taken into account. Consequently, the weight of the container 13 for example in one position of the number of positions 106a, 106b can be sensed directly.

Alternatively, the sensing of the weight may comprise account being taken of the dependence of the normal force on the pivoting angle 16w. Consequently, the weight can be sensed in every alignment of the transporting area 111, for example if the transporting area 111f is sloping with respect to the horizontal and/or if the distributing conveyor 106 is outside the number of positions.

According to various embodiments, a length (i.e. extent along the transporting direction 111) of the distributing conveyor 106 may be in a range from approximately 1.5 m (meter) to approximately 3 m, for example in a range from approximately 1.5 m to approximately 2.5 m, for example approximately 2.2 m.

According to various embodiments, the framework 702 may be configured in such a way that a distance from the distributing conveyor 106 to a base (also referred to as the run-in height) is in a range from 0.5 m (meter) to approximately 1 m, for example approximately 0.8 m.

Figure 8:
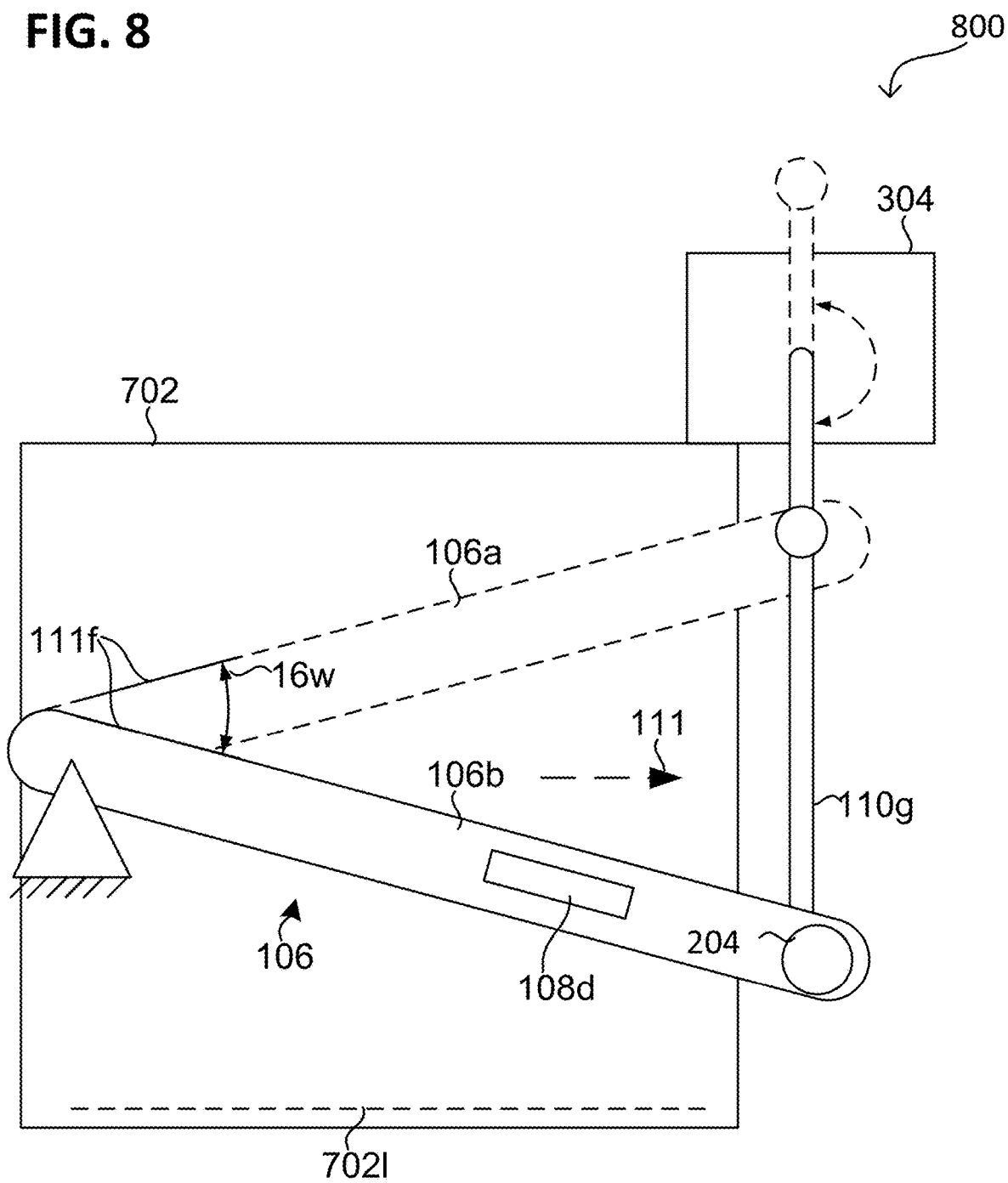
FIG. 8 shows a transporting arrangement according to various embodiments in a schematic cross-sectional view or side view.

FIG. 8 illustrates a transporting arrangement 800 (for example the transporting arrangement 700 and/or the transporting arrangement 1000) according to various embodiments in a schematic cross-sectional view or side view (for example transversely in relation to the transporting direction 111).

For example, the transporting area 111f of the distributing conveyor 106 may be pivoted between mutually adjacent positions of the number of positions 106a, 106b about an angle 16w (also referred to as the pivoting angle 16w) in a range from approximately 10° to approximately 20°, for example approximately 16°. Optionally, the pivoting angle may include the horizontal. For example, the horizontal may be parallel to the angle bisector of the pivoting angle.

The upper-lying eccentric drive 304, 110g of the transporting arrangement 800 (or some other movement gear-mechanism drive 304, 110g that is arranged as upper-lying) in graphic terms makes servicing easier by providing improved accessibility to the components for the service worker. However, the eccentric drive 304, 110g (or some other movement gear-mechanism drive 304, 110g according to various embodiments) may also be arranged differently, for example as under-lying, and/or an upper-lying toggle-lever mechanism drive 304, 110g may also be used.

Optionally, the distributing conveyor 106 may have at least one weight sensor 108d (for example comprising or formed by a balance). For example, the at least one weight sensor 108d may be arranged between the upper strand and the lower strand of the distributing conveyor 106.

For example, the sensing of the weight may comprise account being taken of the dependence of the normal force on the pivoting angle 16w. Consequently, the weight can be sensed for every position of the number of positions, i.e. if the transporting conveyor 106 is in any position of the number of positions. In other words, if the transporting area 111f is sloping with respect to the horizontal, the sensing of the weight may comprise account being taken of the dependence of the normal force on the pivoting angle 16w. Alternatively, the transporting area 111f may be brought into the horizontal for sensing the weight, for example if the distributing conveyor 106 is outside the number of positions.

Figure 9:
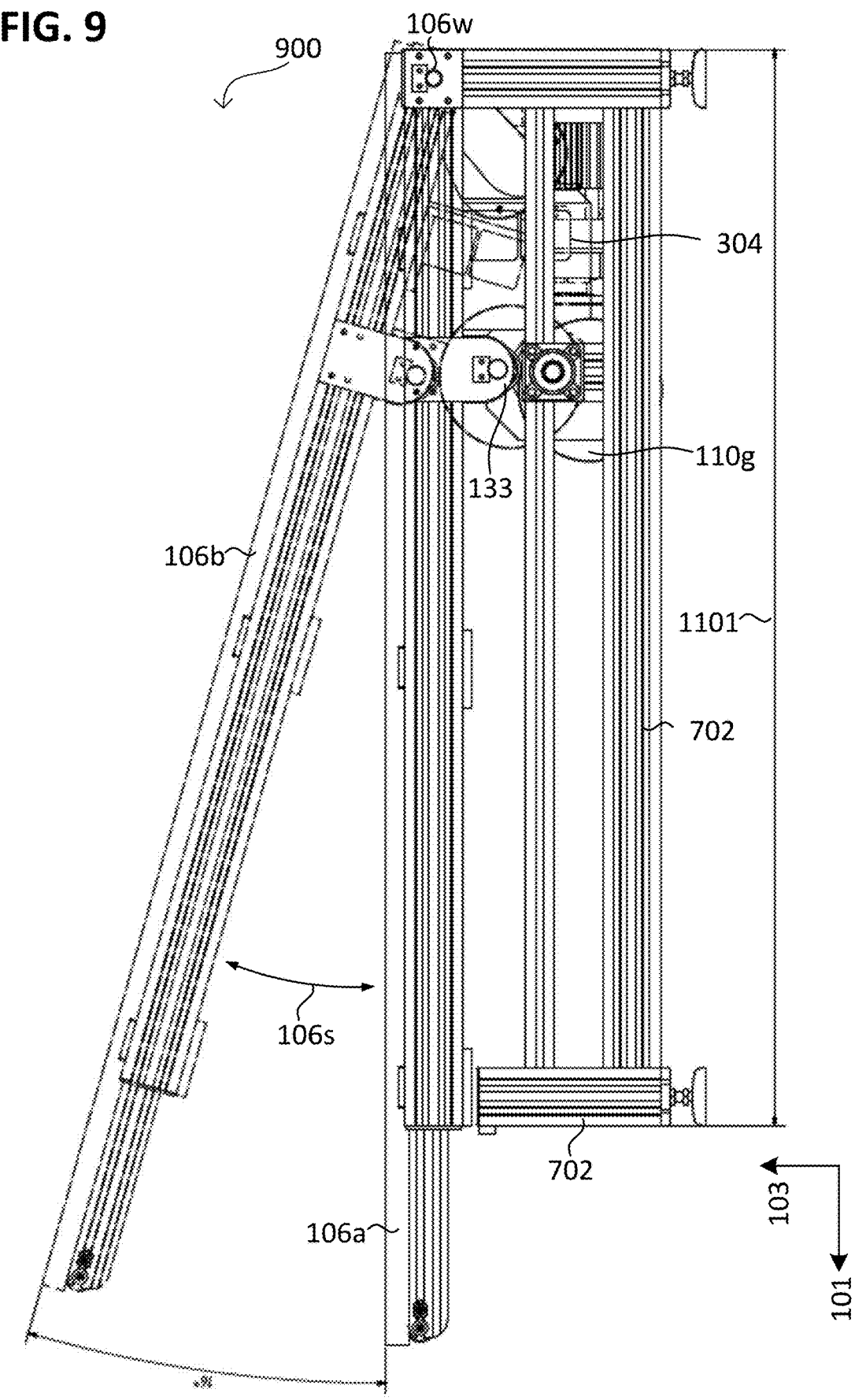
FIGS. 9 and 10 show in each case a transporting arrangement according to various embodiments in a schematic cross-sectional view or side view.

FIG. 9 illustrates a transporting arrangement 900 according to various embodiments in a schematic cross-sectional view or side view (for example transversely in relation to the transporting direction 111). The transporting arrangement 900 may be configured like one of the transporting arrangements previously described, it being possible for the distributing conveyor 106 to protrude beyond the framework 702. Alternatively or in addition, the drive 304 and/or the movement gear mechanism 110g may be arranged under the distributing conveyor 106. In this way, it can be made compact.

According to various embodiments, the movement gear mechanism 110g may have a rotatably mounted roller 133, which is coupled to the distributing conveyor 106 and lies on the eccentric. The rotatably mounted roller 133 may be configured to roll on the eccentric. In this way, the friction can be reduced, and accordingly quicker pivoting 106s can take place.

Figure 10:
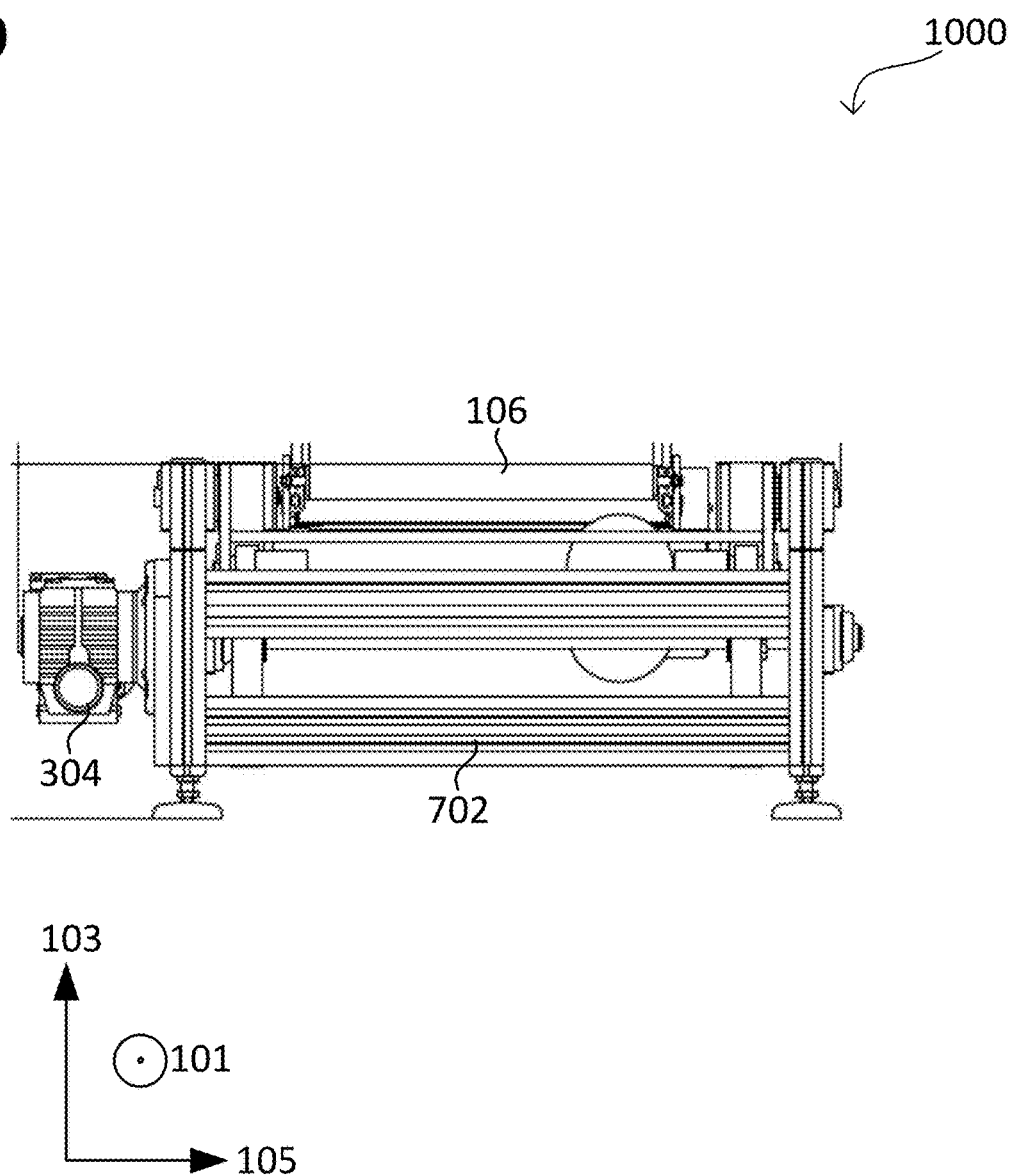

FIG. 10 illustrates a transporting arrangement 1000 according to various embodiments in a schematic cross-sectional view or side view (for example along the transporting direction 111). The transporting arrangement 1000 may be configured like one of the transporting arrangements previously described, it being possible for the drive 304 to be arranged outside the framework 702.

Figure 11:
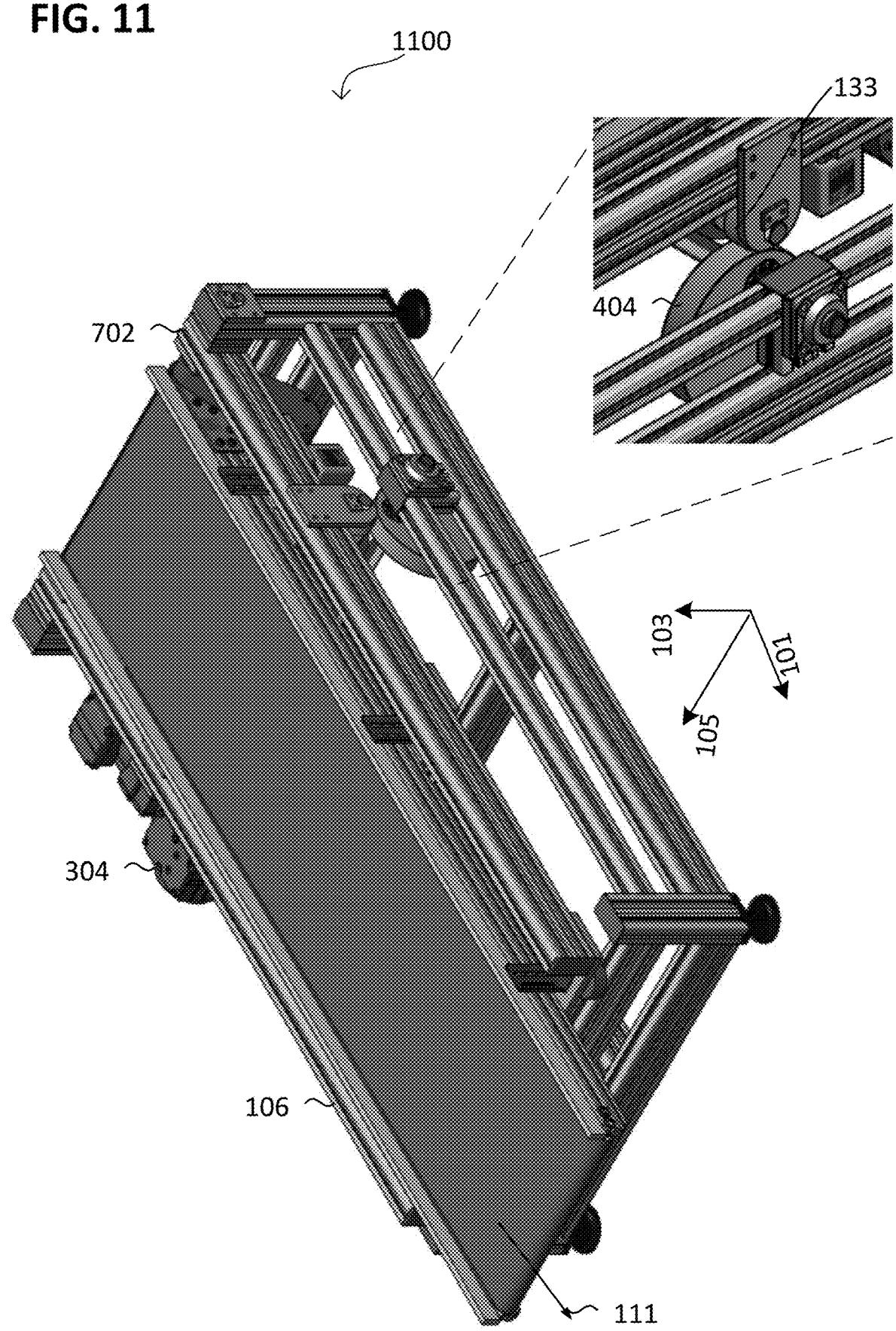
FIGS. 11 and 12 show a transporting arrangement according to various embodiments in various views.
Figure 12:
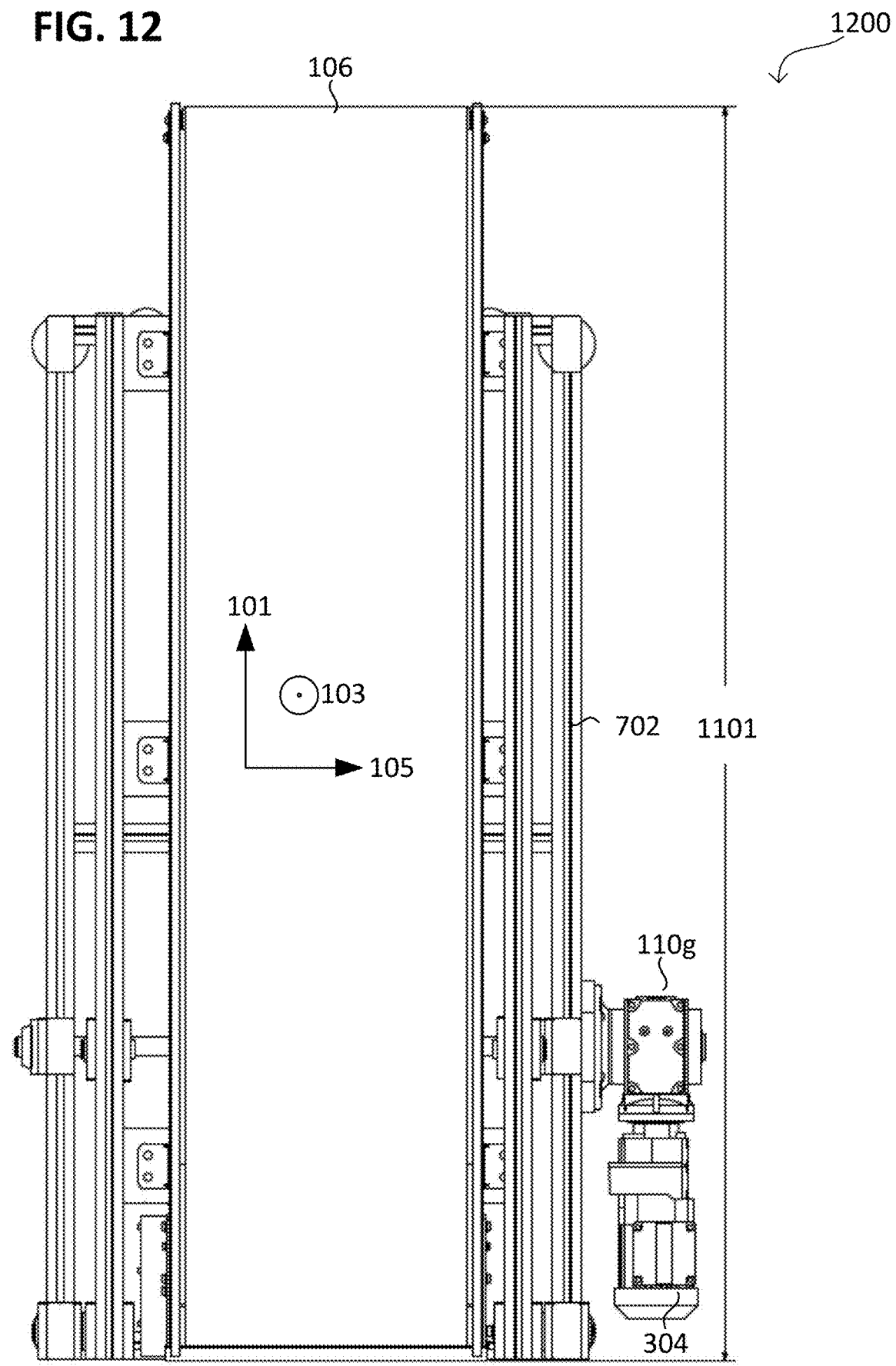

FIG. 11 illustrates a transporting arrangement 1100 (for example the transporting arrangement 900) according to various embodiments in a schematic perspective view and FIG. 12 illustrates it in a schematic plan view 1200. The transporting arrangement 1200 may be configured like one of the transporting arrangements previously described, it being possible for the drive 304 be arranged outside (alternatively inside or else partly outside and partly inside) the framework 702.

Figure 13:
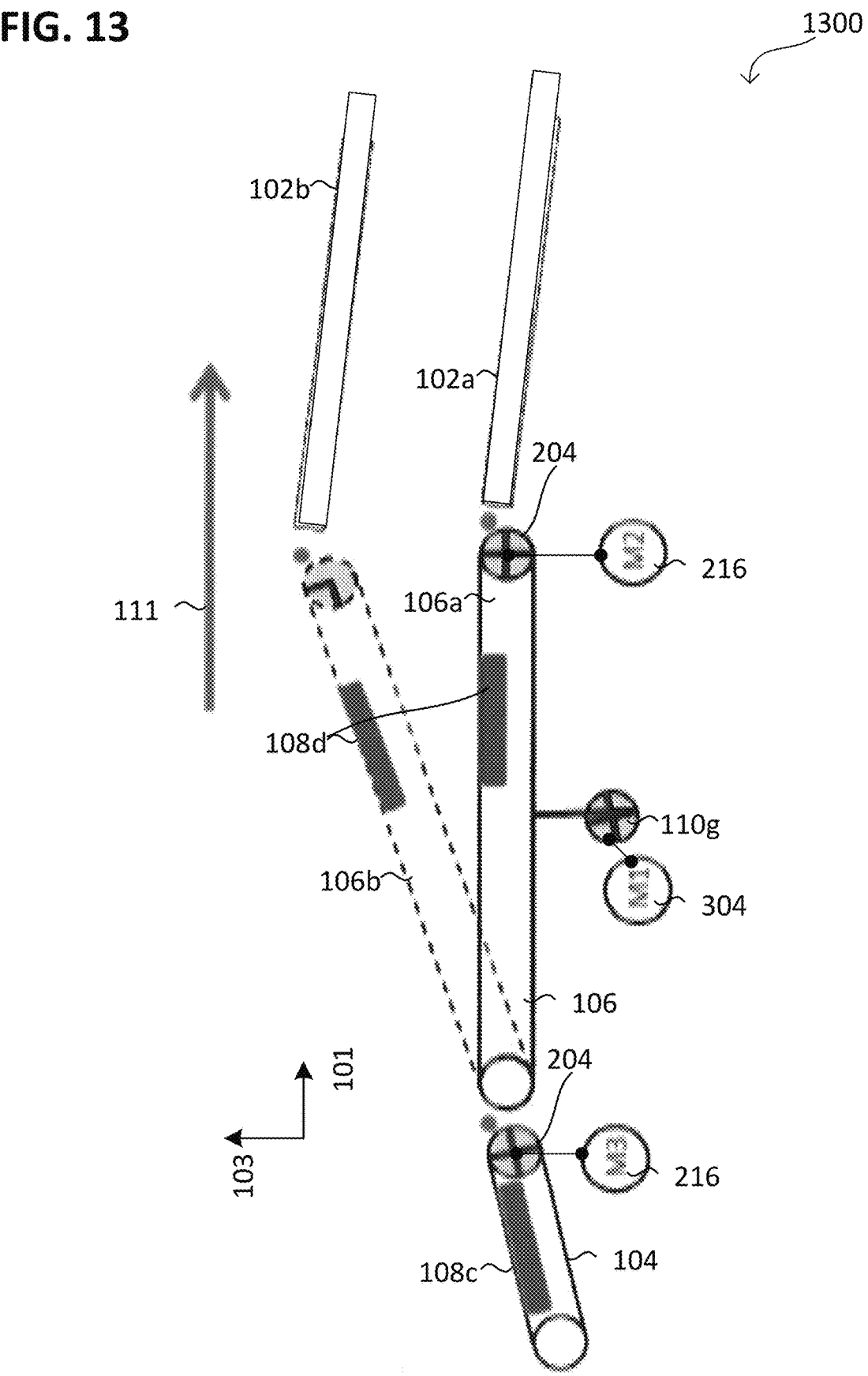
FIG. 13 shows a transporting arrangement according to various embodiments in a schematic cross-sectional view or side view.

FIG. 13 illustrates a transporting arrangement 1300 according to various embodiments in a schematic cross-sectional view or side view (for example along the transporting direction 111). The transporting arrangement 1300 may be configured like one of the transporting arrangements previously described, for example transporting arrangement 100a, 100b, 200c, 300, 400a or 400b.

The transporting arrangement 1300 may have a number of drives 216, 304 (for example electric motors 216, 304).

The sensor arrangement 108 may alternatively or in addition to the at least one optical sensor 108a, 108b have at least one weight sensor 108c, 108d (for example have at least one balance 108c, 108d), for example a first weight sensor 108c (for example a first balance 108c) and/or a second weight sensor 108d (for example a second balance 108d).

According to various embodiments, the at least one weight sensor 108c, 108d may be configured to sense the weight of the container 13. Alternatively or in addition, the at least one weight sensor 108c, 108d may be configured to sense the presence of the container 13 on the respective conveyor 104, 106.

For example, the first weight sensor 108c, if present, may be configured to sense the weight of the container 13 acting on the feeding conveyor 104. In an analogous way, the second weight sensor 108c, if present, may be configured to sense the weight of the container 13 acting on the distributing conveyor 106.

The first weight sensor 108c may for example make it possible that the weight of the container 13 can be sensed before it reaches the distributing conveyor 106, which makes it possible to initiate the pivoting movement of the latter before the container 13 reaches the distributing conveyor 106. This can speed up the distribution by means of the distributing conveyor 106.

For example, the second weight sensor 108d may be pivoted together with the distributing conveyor 106. This can achieve the effect that the weight of the container 13 is reliably sensed in every position of the distributing conveyor 106, since for example more time is available (for example time during the pivoting movement 106s).

For example, the first weight sensor 108c, if present, may be integrated in the feeding conveyor 104. For example, its transporting band may lie on the first weight sensor 108c.

For example, the second weight sensor 108d, if present, may be integrated in the distributing conveyor 106. For example, its transporting band may lie on the second weight sensor 108d.

For example, the at least one weight sensor 108c, 108d may be configured to sense a weight in a range from approximately 1 kg (kilogram) to approximately 5 kg, for example a range from approximately 3 kg (kilogram) to approximately 4 kg. Optionally, the weight sensor 108c, 108d may be configured such that it can be set to a minimum weight, for example in such a way that below the minimum weight it does not sense a weight. If the minimum weight corresponds to the weight threshold value, in graphic terms only the presence of a container 13 that satisfies the criterion can be sensed.

For example, the at least one weight sensor 108c, 108d may be configured such that it can be set to a minimum weight of in a range from approximately 3.5 kg to approximately 5 kg.

Optionally, the pivoting control device 110 may be configured to stop the at least one conveying drive 216 if the presence of a container 13 has been sensed. After that, the pivoting control device 110 can sense the weight by means of the at least one weight sensor 108c, 108d, and start the at least one conveying drive 216 again after the sensing of the weight. In graphic terms, the transport of the container 13 may be interrupted until its weight has been sensed. This can make it possible to increase the certainty and/or increase the measuring accuracy.

As an alternative to a single first weight sensor 108c, a number of first weight sensors 108c that are configured to sense a weight on the feeding conveyor 104 may be used. As an alternative to a single second weight sensor 108d, a number of second weight sensors 108c that are configured to sense a weight on the distributing conveyor 106 may be used. The number of first/second weight sensors 108c, 108d may for example be configured to sense the weight of successive containers 13 in parallel (in other words at least partly at the same time) and/or to sense the weight of one container 13 a number of times one after the other. This can increase the working speed and/or the measuring accuracy.

The at least one weight sensor 108c, 108d (for example the first balance 108c and/or the second balance 108d), or generally the sensor arrangement 108, makes it possible for the conveyor to be independent of the type of taking-back machine. This allows the development, construction and setting up of the taking-back machine to be made easier.

Generally, the local sensing of the container by means of the sensor arrangement 108 close to the distributing conveyor 106 reduces the susceptibility to errors of the transporting arrangement. For example, there is in principle the risk of an external intervention (for example brought about by the user) or a disturbance that changes the stream of empty containers, for example in that containers are removed and/or added. However, according to various embodiments, the effects on the distributing activity of the distributing conveyor 106 of an external intervention, for example the possibility of the removal of empty containers (for example crates) from the stream of empty containers by a user, i.e. on the transporting path, is reduced or prevented by means of the local sensing of the container (for example local data capture). For example, it is possible to dispense with a complicated control capable of tracking the empty containers without disturbances and ensuring that their properties, sensed at the taking-back machine, stay free from disturbances and correct with respect to external interventions, which in turn saves costs and effort.

Figure 14:
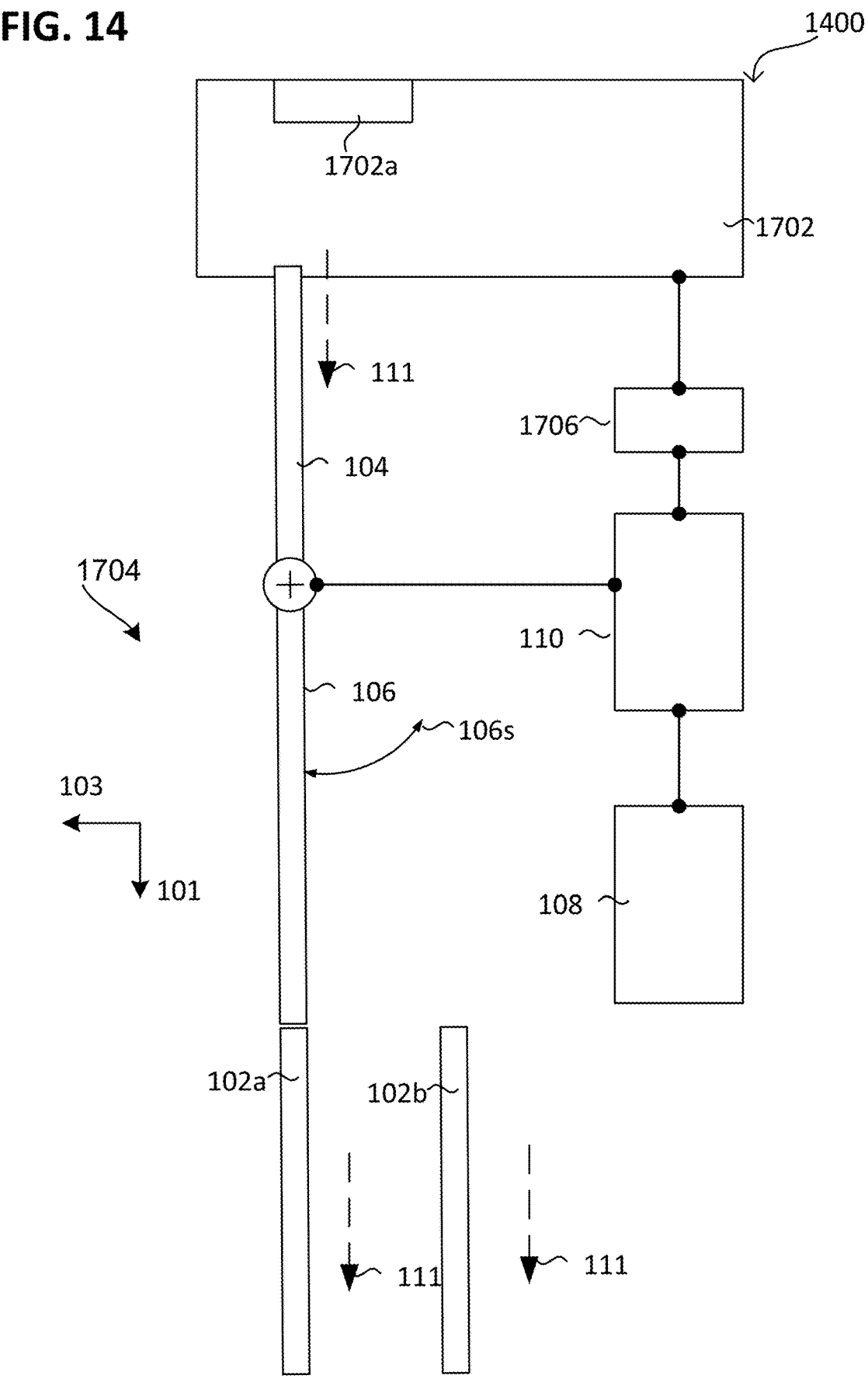
FIG. 14 shows an empty-containing accepting arrangement according to various embodiments in a schematic cross-sectional view or side view.

FIG. 14 illustrates an empty-container accepting arrangement 1400 according to various embodiments in a schematic cross-sectional view or side view (for example in the transporting direction 111).

The empty-container accepting arrangement 1400 may have a taking-back machine 1702 and a transporting arrangement 1704. The transporting arrangement 1704 may be configured like one of the transporting arrangements previously described, for example transporting arrangement 100a, 100b, 200c, 300, 400a or 400b.

The taking-back machine 1702 may have a receiving region 1702a, which is configured to feed to the taking-back machine 1702 a container 13, for example a crate 13, which may optionally carry one or more bottles.

The taking-back machine 1702 may be configured to transport the containers 13 to the transporting arrangement 1704.

Optionally, the taking-back machine 1702 may have at least one optical sensor 108a, 108b for sensing the color property and/or the logo of the container 13 (for example its color stimulus), for example when it is arranged in the receiving region 1702a. In that case, data that represent the color property and/or the logo of the container 13 may be processed centrally by means of an evaluation circuit 1706 and the result may be provided for example for the pivoting control device 110, so that the latter can control the pivoting movement 106s on the basis of the color property and/or the logo, etc. ("full", "not full", "type of container", etc.), for example when the container 13 concerned reaches the distributing conveyor 106.

Optionally, the stream of empty containers may be influenced by means of a diverter 502, which is configured, for example, to expel empty containers (for example empties crates) dependent on data provided by one or more taking-back machines (see above).

Optionally, the sensor arrangement 108 may be configured to detect and/or verify a disturbance, i.e. in graphic terms an "error case" (for example on account of a temporary disturbance, such as deactivation or failure of the diverter or of the distributing conveyor). For example, in the case of an error, full crates may be transported to the "empty crates" transporting level. If the disturbance is detected quickly, the effort involved in correcting it is reduced.

For example, by means of the sensor arrangement 108, the container that has the color property (for example among a number of containers) can be identified and/or its arrival (presence) sensed. In addition, the at least one physical property may be sensed and the pivoting 106s of the distributing conveyor 106 can take place on the basis of the at least one physical property.

Figure 15:
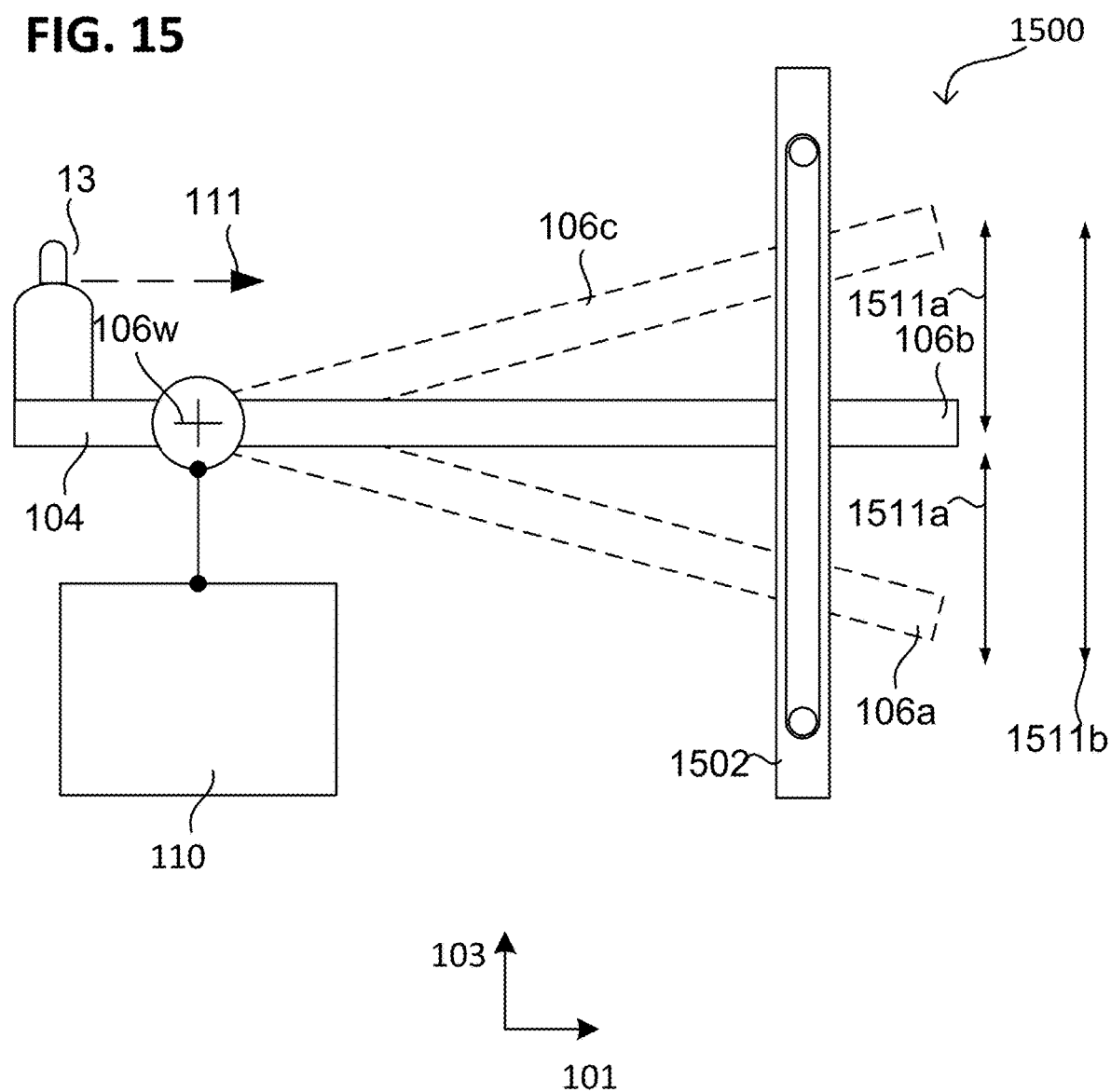
FIG. 15 shows a transporting arrangement according to various embodiments in a schematic cross-sectional view or side view.

FIG. 15 illustrates a transporting arrangement 1500 according to various embodiments in a schematic cross-sectional view or side view (for example in the transporting direction 111). The transporting arrangement 1500 may be configured like one of the transporting arrangements previously described, for example transporting arrangement 100a, 100b, 200c, 300, 400a or 400b.

The distributing conveyor 106 may be mounted pivotably 106s into a number (three or more) of positions 106a, 106b, 106c, i.e. be relocated between the number of positions 106a, 106b, for example between a first pivoting position 106a, a second pivoting position 106b and at least one third pivoting position 106c (for example the third position or additional third position) by means of the pivoting movement 106s.

The transporting arrangement 1500 may have a servo drive 1502, which may have a (for example linear) movement gear mechanism 110g (for example comprising a traction means) and a servomotor. The servo drive 1502 may for example be configured to provide an electronic position, speed and/or torque control, for example for the open-loop and/or closed-loop control of an amplitude-time characteristic (i.e. time dependence of the amplitude) of the pivoting movement 106s.

The servo drive 1502 may for example have a servo amplifier (for example a servo controller and/or a servo control), which is designed to control the rotational speed and/or the torque of the servomotor power-electronically in an open-loop and/or closed-loop manner, for example by means of a frequency and/or an amplitude of the electrical AC voltage (for example three-phase AC voltage) coupled into the servomotor. For example, the servo amplifier may have at least one frequency adjusting element and/or at least one amplitude adjusting element.

The servomotor may have at least one sensor, which is configured to sense a rotational position of the servomotor (for example its motor shaft). The rotational position determined by the sensor may be transmitted, for example continuously, to the servo amplifier and/or be read by it, the servo amplifier being able to control the rotational movement of the motor in a way corresponding to one or more target values that can be set—such as for instance the target angular position of the motor shaft or the target speed—in an open-loop manner by means of a controlled system and/or in a closed-loop manner by means of a control circuit.

According to various embodiments, a control may have a forwardly directed controlled system, and consequently in graphic terms implement a sequence control, which converts an input variable into an output variable. The controlled system may however also be part of a control circuit, so that a closed-loop control is implemented. By contrast with the purely forward control, the closed-loop control comprises that the input variable is continuously influenced by the output variable, which is brought about by the control circuit (feedback). According to various embodiments, the control device may provide open-loop control and/or closed-loop control.

For example, the servo drive 1502 may be configured in such a way that it provides a first (for example sinusoidal) amplitude-time characteristic for a first pivoting movement 1511a between two mutually adjacent pivoting positions, for example when changing from the first pivoting position 106a to the second pivoting position 106b (or vice versa) and/or when changing from the third pivoting position 106c to the second pivoting position 106b (or vice versa). Alternatively or in addition, the servo drive 1502 may be configured in such a way that it provides a second (for example sinusoidal) amplitude-time characteristic for a pivoting movement 1511b between two pivoting positions through another pivoting position (i.e. between two pivoting positions between which another pivoting position is arranged), for example when changing from the first pivoting position 106a to the third pivoting position 106c (or vice versa).

Optionally, the first amplitude-time characteristic and the second amplitude-time characteristic may be transformable into one another, i.e. by means of a coordinate transformation, extension or compression. In graphic terms, the second amplitude-time characteristic may require more time and/or have a greater extreme than the first amplitude-time characteristic, but have the same amplitude-time profile as the first amplitude-time characteristic.

For example, the first amplitude-time characteristic $a1(t)$ and the second amplitude-time characteristic $a2(t)$ may satisfy the following relationship: $c1 \cdot a1(c2 \cdot t) = a2(t)$, for example $a1(c2 \cdot t) = a2(t)$ or $c1 \cdot a1(t) = a2(t)$, where c1 and c2 are rational numbers other than zero (also referred to as the extension factor or compression factor), of which at least one number is not equal to 1, and t is the time (for example in seconds). For example, a1 and a2 may be the amplitude of the pivoting movement (also referred to as the pivoting amplitude), for example the pivoting angle or the pivoting stroke. The pivoting stroke may be understood as meaning the vertical spatial component of a point (for example the tip) of the distributing conveyor 106.

Depending on the arrangement and/or design of the servo drive, the (first and/or second) amplitude-time characteristic may for example have a sinusoidal dependence on time. For example, the amplitude-time characteristic may have a sinusoidal amplitude-time profile, for example it may be a sine function of the time. However, the servo drive may also have a non-linear movement component and/or be sloping in relation to the vertical, which has the consequence that the sine function of the amplitude-time characteristic is for example superposed by further functions.

What is claimed is:

1. A transporting arrangement, comprising:
    a multi-level transporting section, including a first transporting level and a second transporting level arranged above the first transporting level;
    a feeding conveyor for feeding a container in the direction of the multi-level transporting section;
    a distributing conveyor between the feeding conveyor and the multi-level transporting section, wherein the distributing conveyor is mounted at the multi-level transporting section pivotably between the first transporting level and the second transporting level for distributing the container to the first transporting level or the second transporting level;
    a sensor arrangement, which is configured to sense at least one physical property of the container;
    a pivoting control device, which is configured to pivot the distributing conveyor within a determined time period between the first transporting level and the second transporting level if the at least one property satisfies a predetermined criterion, including a movement gear mechanism, wherein the movement gear mechanism comprises an eccentric.

2. The transporting arrangement as claimed in claim 1, wherein the multi-level transporting section comprises an additional transporting level, which at the distributing conveyor is at the height of the first or second transporting level; and
    wherein the transporting arrangement comprises a horizontally distributing device, which is configured to distribute between the first or second transporting level and the additional transporting level;
    wherein the pivoting control device is configured to switch over a transporting direction of the horizontally distributing device between to the first or second transporting level and to the additional transporting level if the at least one property satisfies an additional predetermined criterion.

3. The transporting arrangement as claimed in claim 1, wherein the at least one property represents at least one weight of the container.

4. The transporting arrangement as claimed in claim 1, wherein the sensor arrangement comprises a first weight sensor and/or a second weight sensor, wherein the first weight sensor is configured to sense a weight acting on the feeding conveyor; wherein the second weight sensor is configured to sense a weight acting on the distributing conveyor; wherein the at least one property represents at least the weight sensed by means of the first weight sensor and/or the second weight sensor.

5. The transporting arrangement as claimed in claim 1, wherein the feed conveyor and/or the distributing conveyor comprises a transporting band.

6. The transporting arrangement as claimed in claim 1, wherein the multi-level transporting section comprises a third transporting level, which is arranged above or below the distributing conveyor; wherein the feeding conveyor comprises an additional distributing conveyor, wherein the additional distributing conveyor is mounted pivotably between the distributing conveyor and the third transporting level for distributing the feed to the third transporting level or the distributing conveyor;
    wherein the pivoting control device is further configured to pivot the additional distributing conveyor between the third transporting level and the distributing conveyor if the at least one property satisfies a predetermined further additional criterion.

7. The transporting arrangement as claimed in claim 1, wherein the feeding conveyor is configured to transport the container and at least one additional container immediately following it with a transporting speed and a distance from one another;

wherein the pivoting control device is configured to pivot the distributing conveyor between the first transporting level and the second transporting level within a time period, the time period corresponding to the quotient of the distance and the transporting speed.

8. An empty-container accepting arrangement, comprising:

a taking-back machine; and a transporting arrangement for transporting a container accepted by the taking-back machine;

wherein the transporting arrangement comprises:

a multi-level transporting section, including a first transporting level and a second transporting level arranged above the first transporting level;

a feeding conveyor for feeding a container in the direction of the multi-level transporting section;

a distributing conveyor between the feeding conveyor and the multi-level transporting section, wherein the distributing conveyor is mounted at the multi-level transporting section pivotably between the first transporting level and the second transporting level for distributing the container to the first transporting level or the second transporting level;

a sensor arrangement, which is configured to sense at least one physical property of the container;

a pivoting control device, which is configured to pivot the distributing conveyor within a determined time period between the first transporting level and the second transporting level if the at least one property satisfies a predetermined criterion, including a movement gear mechanism, wherein the movement gear mechanism comprises an eccentric.

\* \* \* \* \*